United States Patent
Watanabe et al.

[19]

[11] Patent Number: 6,001,164

[45] Date of Patent: Dec. 14, 1999

[54] HYDRATED ZINC STANNATE SOLS, COATING COMPOSITIONS AND OPTICAL ELEMENTS

[75] Inventors: Yoshitane Watanabe; Keitaro Suzuki; Yoshinari Koyama; Motoko Iijima, all of Funabashi, Japan

[73] Assignee: Nissan Chemical Industries, Ltd., Tokyo, Japan

[21] Appl. No.: 09/139,650

[22] Filed: Aug. 25, 1998

Related U.S. Application Data

[62] Division of application No. 08/659,371, Jun. 6, 1996, Pat. No. 5,891,362.

[30] Foreign Application Priority Data

| Jun. 13, 1995 | [JP] | Japan | 7-170249 |
| Jul. 12, 1995 | [JP] | Japan | 7-199070 |
| Aug. 24, 1995 | [JP] | Japan | 7-215795 |
| Aug. 28, 1995 | [JP] | Japan | 7-218915 |

[51] Int. Cl.$^6$ ............... C09D 183/06; C09D 183/08
[52] U.S. Cl. .................. 106/287.13; 106/18.27; 106/287.11; 106/287.14; 106/287.19; 428/403; 516/88
[58] Field of Search ............ 252/582; 106/18.27, 106/286.6, 286.7, 287.19, 287.13, 287.14, 286.4, 287.11; 423/92, 102; 428/384, 403; 516/92, 88

[56] References Cited

U.S. PATENT DOCUMENTS

| 3,689,300 | 9/1972 | Bunger et al. | 106/287.13 X |
| 4,378,250 | 3/1983 | Treadway et al. | 106/287.13 X |
| 5,094,691 | 3/1992 | Watanabe et al. | 106/286.4 |
| 5,188,667 | 2/1993 | Watanabe et al. | 106/286.4 |
| 5,209,911 | 5/1993 | Randall | 423/92 |
| 5,366,545 | 11/1994 | Yajima et al. | 106/286.4 |
| 5,460,738 | 10/1995 | Watanabe et al. | 516/90 |
| 5,472,797 | 12/1995 | Yajima et al. | 428/403 X |
| 5,858,077 | 1/1999 | Kayanoki | 106/287.11 |
| 5,891,362 | 4/1999 | Watanabe et al. | 516/88 |

FOREIGN PATENT DOCUMENTS

| 0 183 052 | 6/1986 | European Pat. Off. . |
| 0 537 479 | 4/1993 | European Pat. Off. . |
| 0 582 386 | 2/1994 | European Pat. Off. . |
| 2 383 220 | 10/1978 | France . |
| WO 90/09962 | 9/1990 | WIPO . |
| WO 91/01273 | 2/1991 | WIPO . |

OTHER PUBLICATIONS

Database WPI, Derwent Publications, AN–93–080130, JP–A–05 024 833, Feb. 2, 1993.
Database WPI, Derwent Publications, AN–93–080132, JP–A–05 024 835, Feb. 2, 1993.
Research Disclosure, No. 353, p. 633, Sep. 1993, "Colloidal Metal Stannates and Metal Hydroxystannates".

*Primary Examiner*—Richard D. Lovering
*Attorney, Agent, or Firm*—Oblon, Spivak, McClelland, Maier & Neustadt, P.C.

[57] ABSTRACT

A sol having dispersed in a liquid medium particles of a hydrated zinc stannate having a primary particle diameter of from 2 to 200 nm and represented by the formula $xZnO \cdot ySnO_2 \cdot zH_2O$ wherein the molar ratio of x:y:z is 1:0.83 to 1.43:1.00 to 5.00.

10 Claims, 11 Drawing Sheets

HYDRATED ZINC STANNATE SOLS, COATING COMPOSITIONS AND OPTICAL ELEMENTS

This application is a division of application Ser. No. 08/659,371, filed on Jun. 6, 1996, and now U.S. Pat. No. 5,891,362.

The present invention relates to a hydrated zinc stannate sol and a process for its production, and a sol having dispersed in a liquid medium colloidal particles of a modified metal oxide having a primary particle diameter of from 4.5 to 100 nm, formed by coating the surface of colloidal particles of an oxide of a metal having a valence of 3, 4 or 5, with colloidal particles of a hydrated zinc stannate, and a process for its production.

The hydrated zinc stannate sol and the modified metal oxide sol obtainable by the present invention are useful as microfillers to be used as a hard coating agent with a high refractive index to be applied on the surface of plastic lenses, films or plastic molded products, or they may be mixed with various resin emulsions for use as flame retardants for fibers or may be dispersed in polymers such as modacrylic resins for use as flame proof fibers.

Further, the present invention relates to a coating composition wherein the particles in the above sol components are used as microfillers, to form a coating film excellent in the scratch resistance, surface hardness, abrasion resistance, transparency, heat resistance, light resistance, weather resistance, particularly water resistance, on eyeglasses, camera lenses, window glasses for automobiles or optical elements such as optical filters used for liquid crystal display devices or plasma display devices, and it further relates to an optical element employing such a coating composition.

Hydrated zinc stannate is disclosed as $ZnSnO_3.4H_2O$ in Journal of the American Ceramic Society, vol 36, p. 207 (1953), or as $ZnSnO_3.3H_2O$ in Acta Cryst, vol. 13, p. 601 (1960).

In recent years, several methods in a wet system have been reported. For example, U.K. Patent No. 2,230,255 discloses a method for producing a powder of hydrated zinc stannate which comprises mixing an aqueous solution of sodium stannate ($Na_2SnO_3.3H_2O$) with an aqueous zinc salt solution to form a precipitate of hydrated zinc stannate, followed by filtration and drying of this precipitate. Japanese Unexamined Patent Publications No. 24831/1993, No. 24832/1993, No. 24833/1993, No. 24834/1993 and No. 24835/1993 propose to produce a powder by mixing an aqueous acidic solution containing stannic ions and zinc ions with an aqueous alkali metal hydroxide solution, an aqueous ammonium carbonate solution, an aqueous ammonium hydrogencarbonate solution or aqueous ammonia to precipitate crystalline hydrated zinc stannate or amorphous hydrated zinc stannate in the form of particles having a particle diameter of from 0.2 to 1.0 μm, followed by filtration and drying to obtain a powder. The powder of such crystalline hydrated zinc stannate or amorphous hydrated zinc stannate is used as an additive-type flame retardant, as dispersed in a polymer.

The conventional methods for producing hydrated zinc stannate are intended to obtain a powder of hydrated zinc stannate to be added to a polymer in order to impart flame retardancy or an effect for preventing generation of toxic gas to the polymer, and they are not concerned with a process for producing a sol containing fine colloidal particles.

A first object of the present invention is to provide a stable hydrated zinc stannate sol which is useful as a transparent flame retarding agent for a halogen-containing resin or a modacrylic resin, or as microfillers for a hard coating agent for plastic lenses (colloidal particles contained in a hard coating agent), and to provide a modified metal oxide sol employing such hydrated zinc stannate. The resin utilizing such a hydrated zinc stannate sol has a high level of flame retardancy, and the hard coating agent employing such a hydrated zinc stannate sol has a high refractive index.

Plastic molded products are used in a large quantity by virtue of their advantageous features such as light weight, good processability and high impact resistance. On the other hand, they have drawbacks that the hardness is inadequate, they are susceptible to scratching, they are likely to be eroded by a solvent, they are likely to be electrified and adsorb a dust, and the heat resistance is inadequate. Thus, as compared with inorganic glass products, they were practically inferior for use as lenses for eyeglasses or window materials.

It has been proposed to apply a hard coat to a plastic molded product. Many compositions have been proposed as coating compositions to be used for such a hard coat. For example Japanese Unexamined Patent Publication No. 11261/1977 proposes to use a coating composition containing, as the main component, an organic silicon compound or its hydrolyzate, as a hard coat for eyeglass lenses. However, this coating agent does not provide adequate scratch resistance. Further, Japanese Unexamined Patent Publication No. 111336/1978 discloses use of a coating agent containing colloidal silica particles, prepared by an addition of a silica sol, as a hard coat for lenses of eyeglasses.

Heretofore, plastic lenses for eyeglasses have been produced mostly by casting diethylene glycol bisallyl carbonate in a monomer state, followed by polymerization. The lenses produced in such a manner have a refractive index of about 1.50 which is low as compared with the refractive index of 1.52 of glass lenses, and in the case of glasses for short sighted, there is a problem that the peripheral thickness has to be increased. Accordingly, in recent years, there has been development of monomers having higher refractive indices than the diethylene glycol bisallyl carbonate. Resin materials having such high refractive indices are disclosed, for example, in Japanese Unexamined Patent Publications No. 13747/1980, No. 166214/1981, No. 23611/1982, No. 54901/1982, No. 133211/1984, No. 199016/1985 and No. 54021/1989.

For lenses with high refractive indices employing such resin materials having high refractive indices, Japanese Unexamined Patent Publications No. 151801/1987 and No. 275682/1988 disclose a coating agent containing a colloidal dispersion of fine particles of an oxide of a metal such as Sb or Ti.

The coating agent containing colloidal silica, prepared by an addition of a silica sol, has a problem that the film obtained by coating and curing the coating agent is likely to create interference fringes which impair the appearance of the lenses. Further, in lenses, an antireflection film composed of a multilayer structure film comprising thin films of inorganic oxides, based on an optical interference theory, is formed, in many cases, on the film obtained by coating and curing of a coating agent. In such a case, if the antireflection film exhibits, for example, a reflection color of extremely pale green, this reflection color changes depending upon the position on the lens surface to form flecking.

To improve the surface of plastic lenses which have been commonly used in recent years, a sol of a metal oxide having a high refractive index has been used as a component of the hard coating agent to be applied on this surface.

For example, Japanese Examined Patent Publication No. 37142/1988 discloses a hard coating agent containing particles of an oxide of a metal such as Al, Ti, Zr, Sn or Sb having a particle diameter of from 1 to 300 nm.

A coating agent containing colloidal tin oxide, prepared by an addition of a tin oxide sol, has a problem that the tin oxide sol has a low compatibility with a silicon-containing substance such as an organic silicon compound or its hydrolyzate for a silane coupling agent, and the stability tends to be low, whereby the film obtainable by coating and curing of such a coating agent, will have no adequate water resistance.

A coating agent containing colloidal titanium oxide, prepared by an addition of a titanium oxide sol, also has a problem that the titanium oxide sol has a low compatibility with a silicon-containing substance such as an organic silicon compound or its hydrolyzate in e.g. a silane coupling agent, and the stability tends to be low, whereby the film obtainable by coating and curing of such a coating agent will have no adequate water resistance.

A coating agent containing colloidal antimony oxide, prepared by an addition of an antimony oxide sol, has a problem that the film obtainable by coating and curing of the coating agent will have a refractive index which is not sufficiently high, although the compatibility of the antimony oxide sol with a silicon-containing substance such as an organic silicon compound or its hydrolyzate in e.g. a silane coupling agent, is high, and the stability may be improved.

Japanese Unexamined Patent Publication No. 217230/1991 proposes a stable sol containing colloidal particles of a modified metal oxide having a particle diameter of from 4.5 to 60 nm, which comprises colloidal particles of an oxide of a metal having a valence of 3, 4 or 5 and having a particle diameter of from 4 to 50 nm, as nuclei, and colloidal particles of a tungsten oxide-stannic oxide composite having a weight ratio of $WO_3/SnO_2$ of from 0.5 to 100 and a particle diameter of from 2 to 7 nm, coated on the surface of the nuclei, wherein the content of the total metal oxides is from 2 to 50 wt %.

Further, Japanese Unexamined Patent Publication No. 24746/1994 proposes a stable sol of a modified stannic oxide-zirconium oxide composite consisting of particles of a structure which comprise colloidal particles of a stannic oxide-zirconium oxide composite having a weight ratio of $ZrO_2/SnO_2$ of from 0.02 to 1.0 and a particle diameter of from 4 to 50 nm, as nuclei, and colloidal particles of a $WO_3$—$SnO_2$ composite having a weight ratio of $WO_3/SnO_2$ of from 0.5 to 100 and a particle diameter of from 2 to 7 nm, coated on the surface of the nuclei.

When the conventional metal oxide sol, particularly the cationic metal oxide sol, is used as a component of a hard coating agent, not only the stability of the resulting hard coating agent will be inadequate, but also the transparency, adhesion and weather resistance of a cured coating film obtained from such a hard coating agent, will be inadequate. Further, when a $Sb_2O_5$ sol is used as a component of a hard coating agent, the refractive index of $Sb_2O_5$ is at a level of from 1.65 to 1.70, and if the refractive index of the plastic material to be used for e.g. lenses is at least 1.6, the refractive index of a cured coating film will no longer adequately be improved by such a $Sb_2O_5$ sol.

The hard coating agent containing particles of an oxide of a metal such as Al, Ti, Zr, Sn or Sb, having a particle diameter of from 1 to 300 nm, as disclosed in the above-mentioned Japanese Examined Patent Publication No. 37142/1988, is not desirable, since the water resistance of a coating film obtained by coating and curing it on a plastic material for e.g. lenses, will be inadequate.

The colloidal particles of the modified metal oxide sol disclosed in the above-mentioned Japanese Examined Patent Publication No. 217230/1991 has a refractive index of at least 1.7. If such a sol is used as a component for a hard coating agent for a plastic lens, the properties required for a hard coat film, such as scratch resistance, transparency, adhesion, water resistance and weather resistance, will be substantially satisfied. However, in a case where the nuclei of the modified metal oxide colloidal particles are made of a stannic oxide sol, the hard coat film obtained by using such a sol, will have a problem in light resistance such as a problem of yellowing when exposed to ultraviolet rays.

Further, the colloidal particles of the modified stannic oxide-zirconium oxide composite sol disclosed in the above Japanese Examined Patent Publication No. 24746/1994, have a refractive index of at least 1.7. If this sol is used as a component of a hard coating agent for a plastic lens, an improvement skill be observed in the performance required for a hard coat film, particularly in the light resistance. However, the coating films obtained by using the sols disclosed in the above-mentioned Japanese Examined Patent Publications No. 217230/1991 and No. 24746/1994 are inadequate in water resistance and light resistance as hard coat films for which high level of properties are required in recent years, since both of them use colloidal particles of a tungsten oxide-stannic oxide composite to coat the nuclei.

A second object of the present invention is to provide a coating composition which is capable of presenting a film free from interference fringes or flecking in reflection colors, when it is coated and cured on an optical element having a high refractive index made of a resin material having a refractive index as high as from 1.54 to 1.70, and an optical element utilizing such a coating composition, and to provide a coating composition for plastic material excellent in e.g. scratch resistance, surface hardness, abrasion resistance, flexibility, transparency, antistatic property, dyability, heat resistance, water resistance and chemical resistance, and an optical element utilizing such a coating composition. Particularly, the present invention is intended to provide a coating agent which is capable of presenting a film free from interference fringes and excellent in scratch resistance, adhesion, water resistance, transparency and light resistance.

In a first aspect, the present invention provides a sol having dispersed in a liquid medium particles of a hydrated zinc stannate having a primary particle diameter of from 2 to 200 nm and represented by the formula $xZnO \cdot ySnO_2 \cdot zH_2O$ wherein the molar ratio of x:y:z is 1:0.83 to 1.43:1.00 to 5.00.

In a second aspect, the present invention provides a sol having dispersed in a liquid medium particles of a modified metal oxide which have a primary particle diameter of from 4.5 to 100 nm and which comprise particles (i) of an oxide of a metal having a valence of 3, 4 or 5, as nuclei, and particles (ii) of a hydrated zinc stannate represented by the formula $xZnO \cdot ySnO_2 \cdot zH_2O$ wherein the molar ratio of x:y:z is 1:0.83 to 1.43:1.00 to 5.00, coated on the surface of the particles (i).

In a third aspect, the present invention provides a coating composition comprising:

(A) at least one silicon-containing substance selected from the group consisting of organic silicon compounds of the formula (I):

wherein each of $R^1$ and $R^3$ is an alkyl group, an aryl group, a halogenated alkyl group, a halogenated aryl group, an alkenyl group, or an organic group having an epoxy group, an acryloyl group, a methacryloyl group, a mercapto group, an amino group or a cyano group, which is bonded to the silicon atom by a Si—C bond, $R^2$ is a $C_{1-8}$ alkyl group, an alkoxyalkyl group, or an acyl group, and each of a and b is an integer of 0, 1 or 2, provided that a+b is an integer of 0, 1 or 2, and the formula (II):

$$[(R^4)_cSi(OX)_{3-c}]_2Y \qquad (II)$$

wherein $R^4$ is a $C_{1-5}$ alkyl group, X is a $C_{1-4}$ alkyl group or an acyl group, Y is a methylene group or a $C_{2-20}$ alkylene group, and c is an integer of 0 or 1, and their hydrolyzates; and (B) particles of a hydrated zinc stannate having a primary particle diameter of from 2 to 200 nm and represented by the formula $xZnO.ySnO_2.zH_2O$ wherein the molar ratio of x:y:z is 1:0.83 to 1.43:1.00 to 5.00.

In a fourth aspect, the present invention provides a coating composition comprising:

(A) at least one silicon-containing substance selected from the group consisting of organic silicon compounds of the formula (I):

$$(R^1)_a(R^3)_bSi(OR^2)_{4-(a+b)} \qquad (I)$$

wherein each of $R^1$ and $R^3$ is an alkyl group, an aryl group, a halogenated alkyl group, a halogenated aryl group, an alkenyl group, or an organic group having an epoxy group, an acryloyl group, a methacryloyl group, a mercapto group, an amino group or a cyano group, which is bonded to the silicon atom by a Si—C bond, $R^2$ is a $C_{1-8}$ alkyl group, an alkoxyalkyl group, or an acyl group, and each of a and b is an integer of 0, 1 or 2, provided that a+b is an integer of 0, 1 or 2, and the formula (II):

$$[(R^4)_cSi(Ox)_{3-c}]_2Y \qquad (II)$$

wherein $R^4$ is a $C_{1-5}$ alkyl group, X is a $C_{1-4}$ alkyl group or an acyl group, Y is a methylene group or a $C_{2-20}$ alkylene group, and c is an integer of 0 or 1, and their hydrolyzates; and (B') particles of a modified metal oxide which have a primary particle diameter of from 4.5 to 100 nm and which comprise particles (i) of an oxide of a metal having a valence of 3, 4 or 5, as nuclei, and particles (ii) of a hydrated zinc stannate represented by the formula $xZnO.ySnO_2.zH_2O$ wherein the molar ratio of x:y:z is 1:0.83 to 1.43:1.00 to 5.00, coated on the surface of the particles (i).

Now, the present invention will be described in detail with reference to the preferred embodiments.

The particles of a hydrated zinc stannate dispersed in the sol in the first aspect of the present invention, have a primary particle diameter of from 2 to 200 nm, preferably from 5 to 100 nm. Here, the primary particle diameter is not a diameter of an agglomerated particle but a diameter of an individual particle when an agglomerated particle has been dissociated into individual particles, and such a primary particle diameter can be measured by an electron microscope.

The hydrated zinc stannate constituting the above particles, is represented by the general formula $xZnO.ySnO_2.zH_2O$ wherein x:y:z=1:0.83 to 1.43:1.00 to 5.00 and may, for example, be present in the form of $ZnSnO_3.zH_2O$ (which may be represented also by $ZnO.SnO_2.zH_2O$) wherein z is from 3.00 to 5.00, which corresponds to the general formula wherein $ZnO:SnO_2=1:1$ i.e. a fixed ratio, or $ZnO.(SnO_2)_a.zH_2O$ wherein a is from 0.83 to 1.43 and z is from 1.00 to 5.00, which corresponds to the general formula wherein $ZnO:SnO_2=1:0.83$ to 1.43 i.e. a non-fixed ratio.

The liquid medium in which the particles of a hydrated zinc stannate are dispersed, may, for example, be an aqueous medium, or a hydrophilic organic solvent such as methanol, ethanol or isopropanol.

As a process for producing the sol according to the first aspect of the present invention, a first process is a process which comprises the following steps (a), (b) and (c):

(a) a step of reacting a zinc salt and a stannate in an aqueous medium in the presence of hydrogen peroxide to obtain an aqueous medium having dispersed therein colloidal particles of a hydrated zinc stannate having a Zn/Sn molar ratio of from 0.7 to 1.2;

(b) a step of heating the aqueous medium having dispersed therein colloidal particles of a hydrated zinc stannate, obtained in step (a), at a temperature of from 30 to 200° C.; and (c) a step of removing an electrolyte from the aqueous medium having dispersed therein colloidal particles of a hydrated zinc stannate, obtained in step (b).

The zinc salt to be used in step (a) may be any zinc salt of an inorganic or organic acid, so long as it is water-soluble. For example, it may be zinc chloride, zinc nitrate, zinc sulfate, zinc acetate or zinc gluconate. These salts may be used alone or in combination as a mixture of two or more of them. However, a zinc salt of an inorganic acid such as zinc chloride or zinc sulfate is preferred from the viewpoint of the production cost for the sol or waste water treatment, and such salts may be used alone or in combination as a mixture of two or more of them. Such a zinc salt may be used in the form of an aqueous solution having a concentration of from 0.1 to 20 wt % as calculated as ZnO.

The stannate to be used in step (a) is preferably a water-soluble alkali metal stannate such as sodium stannate ($Na_2SnO_3.3H_2O$) or potassium stannate ($K_2SnO_3.3H_2O$). These stannates may be used alone or in combination as a mixture. Such a stannate may be used in the form of an aqueous solution having a concentration of from 0.1 to 20 wt % as calculated as $SnO_2$.

The hydrogen peroxide to be users in step (a), may be used in the form of an aqueous solution having a concentration of from 5 to 60 wt % as $H_2O_2$.

In step (a), the zinc salt and the stannate are reacted in the aqueous medium in the presence of hydrogen peroxide in a Zn/Sn molar ratio of from 0.7 to 1.2, to obtain colloidal particles of a hydrated zinc stannate having a Zn/Sn molar ratio of from 0.7 to 1.2. If the Zn/Sn molar ratio in the above reaction is less than 0.7, colloidal particles of tin oxide ($SnO_2$) will form, such being undesirable, and if it exceeds 1.2, colloidal particles of $Zn(OH)_2$ will form, such being undesirable.

In step (a), the reaction of the zinc salt and the stannate in the presence of hydrogen peroxide is preferably carried out in an aqueous medium prepared by mixing an aqueous stannate solution with an aqueous zinc salt solution having an aqueous hydrogen peroxide solution added thereto. The addition of an aqueous hydrogen peroxide solution may be made to one or both of the aqueous zinc salt solution and the aqueous stannate solution. However, it is preferred to add it to the aqueous zinc salt solution, since the aqueous stannate solution is alkaline. In step (a), the amount of hydrogen peroxide present in the aqueous medium may be in a molar ratio of $H_2O_2/Zn$ of from 0.5 to 20.0, preferably from 1.0 to 18.0. Hydrogen peroxide has a function to control the particle diameter of colloidal particles, when the zinc salt and the stannate are reacted to form colloidal particles of a hydrated zinc stannate. If the above $H_2O_2/Zn$ molar ratio is less than 0.5, a part of colloidal particles of a hydrated zinc stannate will have a primary particle diameter exceeding 200 nm, and if the molar ratio exceeds 20.0, hydrogen peroxide will be excessive, such being uneconomical.

In step (a), mixing of the aqueous stannate solution with the aqueous zinc salt solution having an aqueous hydrogen peroxide solution added thereto, may be carried out by a method of mixing both solutions simultaneously or a method of dropwise adding one of the aqueous solutions to the other aqueous solution. By either method, it is possible to obtain colloidal particles of a hydrated zinc stannate having a Zn/Sn molar ratio of from 0.7 to 1.2. However, in order to avoid agglomeration, it is preferred to employ a method of dropwise adding the aqueous zinc salt solution having an aqueous hydrogen peroxide solution added thereto, to the aqueous stannate solution. This dropwise addition is carried out at a temperature of from 20 to 80° C. over a period of from 0.5 to 5 hours. It is preferred that the aqueous zinc salt solution having an aqueous hydrogen peroxide solution added thereto, is dropwise added by a quantitative pump to the aqueous stannate solution with stirring by means of a stirring device such as a disper. It is preferred to mix both solutions so that by this mixing, the hydrated zinc stannate formed in the aqueous medium will be at a concentration of from 0.1 to 20 wt %, preferably from 1.0 to 10 wt %. The pH of this mixed solution is usually from 3 to 12, preferably from 5 to 9. Further, if necessary, the pH can be adjusted by an addition of an aqueous acidic solution or an aqueous alkaline solution. If the pH is less than 3, an unreacted zinc salt will remain, whereby the yield tends to be low, and if the pH exceeds 12, an unreacted stannate will remain, whereby the yield tends to be low, such being undesirable.

In step (a), the aqueous medium may contain a hydroxycarboxylic acid, its salt or a mixture thereof in an amount of at most 1.5 mols, preferably from 0.05 to 1.5 mols, per mol of Sn in the stannate. By the addition of such a hydroxycarboxylic acid or its salt, it is possible to obtain a hydrated zinc stannate sol having high dispersibility or transparency. As such a hydroxycarboxylic acid or its salt, the one soluble in water is employed. The hydroxycarboxylic acid may, for example, be gluconic acid, tartaric acid or citric acid, and the salt of a hydroxycarboxylic acid may, for example, be an alkali metal salt, an ammonium salt or an organic basic salt of e.g. gluconic acid, tartaric acid or citric acid. The alkali metal salt may, for example, be sodium gluconate or potassium citrate, and the organic basic salt may, for example, be propylamine gluconate or monoethanolamine tartarate. The hydroxycarboxylic acid or its salt may be added after formation of colloidal particles of a hydrated zinc stannate, but it is preferred to add it before or during formation of the colloidal particles. Such a hydroxycarboxylic acid or its salt may be incorporated to the aqueous medium by adding it to either the aqueous stannate solution or the aqueous zinc salt solution. However, it is preferred to add the hydroxycarboxylic acid or its salt to the aqueous stannate solution in the method of dropwise adding the aqueous zinc salt solution having an aqueous hydrogen peroxide solution added thereto, to the aqueous stannate solution with stirring. Such a hydroxycarboxylic acid or its salt may be added to the aqueous stannate solution directly or in the form of an aqueous solution having a concentration of from 1 to 50 wt %.

In step (b), the aqueous medium having dispersed therein colloidal particles of a hydrated zinc stannate, obtained in step (a), is heated for aging at a temperature of from 30 to 200° C., preferably from 60 to 100° C., for from 0.1 to 50 hours, preferably from 1 to 10 hours. If the temperature for heating exceeds 100° C., an autoclave or the like will be required. If the heating time for aging is less than 0.1 hour, the effects will be small, and the time may exceeds 50 hours, but such is uneconomical. The aqueous medium having dispersed therein colloidal particles of a hydrated zinc stannate, obtained by step (b), is capable of improving the dispersibility or transparency of the sol obtained by adding an alkaline substance for alkalization to a pH of from 9 to 12. Such an alkaline substance may, for example, be an amine, a quaternary ammonium hydroxide or an alkali metal hydroxide, but an amine is particularly preferred. As such an amine, monoethanolamine or isopropylamine may, for example, be mentioned.

In step (c), an excess electrolyte such as cations (alkali metal ions) or anions (acid radicals), can be removed by a combination of ultrafiltration and washing with water, from the aqueous medium having dispersed therein colloidal particles of a hydrated zinc stannate (the aqueous sol of a hydrated zinc stannate) obtained in step (b). In a case where the electrolyte is removed by ultrafiltration, such an operation can be carried out at a temperature of at most 100° C., preferably from room temperature to 60° C., depending upon the material of the ultrafilter to be employed. Further, if necessary, the electrolyte may be reduced by further treatment with a cation exchange resin or an anion exchange resin. The anion exchange resin is used in a hydroxyl group form, and a commercially available anion exchange resin may be employed. Anions can be readily reduced by a method of passing the sol through a column packed with the anion exchange resin. Passing the sol through the column is preferably conducted at a temperature of from 0 to 60° C. at a space velocity (SV) of from 1 to 10 $hr^{-1}$. The cation exchange resin is used in a hydrogen form, and a commercially available cation exchange resin may be employed. The necessary amount of the cation exchange resin may directly be added and stirred for treatment.

By the removal of an excess electrolyte in step (c), it is possible to obtain a hydrated zinc stannate sol of the present invention having excellent transparency and adequate stability. The sol obtained in step (c) has a pH of from 3 to 12, preferably from 5 to 11 and contains the hydrated zinc stannate at a concentration of from 5 to 20 wt %. The hydrated zinc stannate particles in the sol thereby obtained, have a primary particle diameter of from 2 to 200 nm and are represented by the formula $xZnO \cdot ySnO_2 \cdot zH_2O$ wherein the molar ratio of x:y:z is 1:0.83 to 1.43:1.00 to 5.00. With respect to the hydrated zinc stannate particles in the sol thereby obtained, the proportions of zinc, tin and water of crystallization can be confirmed by a method such as a fluorescent X-ray analysis or a differential thermal analysis.

To further increase the concentration of the sol obtained in step (c), a further step may be adopted as step (d) wherein a small amount of an organic base or an organic acid is added thereto as a stabilizer, followed by concentration to a level of 40 wt % by an apparatus such as a rotary evaporator or an ultrafiltration apparatus. The organic base to be used, may, for example, be an alkylamine, an alkanolamine or a quaternary ammonium hydroxide. For example, n-propylamine, isopropylamine, diisobutylamine, ethylenediamine, monoethanolamine or triethanolamine may be mentioned. The organic acid may, for example, be a hydroxycarboxylic acid such as glycolic acid, tartaric acid or citric acid. The aqueous medium for the aqueous sol obtained in step (c) or the subsequent step (d) may be substituted by a hydrophilic organic solvent in step (e) to obtain an organo sol. This substitution can be carried out by a conventional method such as distillation or ultrafiltration. Such a hydrophilic organic solvent may, for example, be a lower alcohol such as methanol, ethanol or isopropanol, a linear amide such as dimethylformamide or N,N'-dimethylacetamide, a cyclic amide such as N-methyl-2-pyrrolidone, a glycol ether such as ethyl CELLOSOLVE (β-hydroxydiethyl ether), or ethylene glycol. The particles in the organo sol obtained in step (e) have the same primary particle diameter as the particles in the aqueous sol obtained in step (c).

As a process for producing the sol according to the first aspect of the present invention, a second process is a process which comprises the following steps (a'), (b'), (c') and (d'):

(a') a step of neutralizing a zincate and a stannate with an acid in an aqueous medium in the presence of hydrogen peroxide to obtain an aqueous medium containing agglomerates of colloidal particles of a hydrated zinc stannate having a Zn/Sn molar ratio of from 0.7 to 1.2;

(b') a step of heating the aqueous medium containing the agglomerates of colloidal particles of a hydrated zinc stannate, obtained in step (a'), at a temperature of from 30 to 200° C.;

(c') a step of removing an electrolyte from the aqueous medium containing the agglomerates of colloidal particles of a hydrated zinc stannate, obtained in step (b'); and (d') a step of peptizing the agglomerates of colloidal particles of a hydrated zinc stannate in the aqueous medium obtained in step (c').

The zincate to be used in step (a'), may be any zincate so long as it is water-soluble. Such a zincate is preferably an alkali metal zincate such as sodium zincate or potassium zincate. Such an alkali metal zincate is used preferably in the form of an aqueous alkaline solution of a composition having a $M_2O/ZnO$ molar ratio of at least 2.0, since the normal salt (represented by the general formula $M_2O.ZnO.nH_2O$ wherein M is an alkali metal atom) is susceptible to hydrolysis. It is preferred that the zincate is used in the form of an aqueous solution having a concentration of from 0.1 to 20 wt % as ZnO.

The stannate to be used in step (a') is preferably a water-soluble alkali metal stannate such as sodium stannate ($Na_2SnO_3.3H_2O$) or potassium stannate ($K_2SnO_3.3H_2O$). These stannates may be used alone or in combination as a mixture. Such a stannate may be used in the form of an aqueous solution having a concentration of from 0.1 to 20 wt % as $SnO_2$.

The hydrogen peroxide to be used in step (a'), may be used in the form of an aqueous solution having a concentration of from 5 to 60 wt % as $H_2O_2$.

In step (a'), the zincate and the stannate are mixed in a Zn/Sn molar ratio of from 0.7 to 1.2 in the presence of hydrogen peroxide and neutralized with an acid in an aqueous medium, to obtain agglomerates composed of colloidal particles of a hydrated zinc stannate having a Zn/Sn molar ratio of from 0.7 to 1.2. If the Zn/Sn molar ratio at the time of mixing the zincate and the stannate, is less than 0.7, colloidal particles of stannic oxide ($SnO_2$) will form, such being undesirable, and if it exceeds 1.2, colloidal particles of $Zn(OH)_2$ will form, such being undesirable.

In step (a'), the colloidal particles of a hydrated zinc stannate having a Zn/Sn molar ratio of from 0.7 to 1.2, have a primary particle diameter: of from 2 to 200 nm, but the colloidal particles having such a primary particle diameter form agglomerates. Accordingly, the aqueous medium containing agglomerates of such colloidal particles of a hydrated zinc stannate, may be regarded as a slurry.

The acid to be used in step (a') may, for example, be an inorganic acid such as hydrochloric acid, nitric acid, sulfuric acid or sulfamic acid, or an organic acid such as formic acid, acetic acid or oxalic acid. However, an inorganic acid is preferred from the viewpoint of the production cost or waste water treatment. Such an acid can be used in the form of an aqueous solution having a concentration of from 0.1 to 20 wt %.

In step (a'), the reaction for neutralizing the zincate and the stannate with an acid in the presence of hydrogen peroxide, is preferably carried out in an aqueous medium prepared by mixing an aqueous solution containing the zincate and the stannate with an aqueous acid solution having an aqueous hydrogen peroxide added thereto.

The aqueous solution containing the zincate and the stannate is prepared preferably by mixing an aqueous zincate solution and an aqueous stannate solution. Further, the aqueous hydrogen peroxide solution may be added to either the aqueous solution containing the zincate and the stannate or the aqueous acid solution. However, it is preferred to add it to the aqueous acid solution, since the mixed aqueous solution of the aqueous zincate solution and the aqueous stannate solution, is alkaline. In the reaction for neutralizing the zincate and the stannate with an acid in the presence of hydrogen peroxide in step (a'), the amount of the hydrogen peroxide in the aqueous medium may be such that the molar ratio of $H_2O_2/Zn$ is from 0.5 to 20.0, preferably from 1.0 to 18. The hydrogen peroxide has a function to control the particle diameter of the colloidal particles when the zincate and the stannate are neutralized with the acid to form agglomerates of colloidal particles of a hydrated zinc stannate. If the $H_2O_2/Zn$ molar ratio is less than 0.5, a part of colloidal particles of a hydrated zinc stannate will have a primary particle diameter exceeding 200 nm, and if it exceeds 20.0, such is uneconomical.

In step (a'), mixing of the aqueous solution containing the zincate and the stannate and the aqueous acid solution having an aqueous hydrogen peroxide solution added thereto, may be carried out by a method of mixing both solutions simultaneously, or a method of dropwise adding one of them to the other aqueous solution. By either method, it is possible to obtain agglomerates of colloidal particles of a hydrated zinc stannate having a Zn/Sn molar ratio of from 0.7 to 1.2. However, in order to avoid formation of flocs, it is preferred to employ a method of dropwise adding the aqueous acid solution having an aqueous hydrogen peroxide solution added thereto, to the aqueous solution containing the zincate and the stannate. This dropwise addition is carried out at a temperature of from 20 to 80° C. over a period of from 0.5 to 5 hours. It is preferred that the aqueous acid solution having an aqueous hydrogen peroxide solution added thereto, is dropwise added by a quantitative pump to the aqueous solution containing the zincate and the stannate with stirring by means of a stirring device such as a disper. It is preferred that the two solutions are mixed so that by the mixing, the hydrated zinc stannate formed in the aqueous medium would be at a concentration of from 0.1 to 20 wt %, preferably from 1.0 to 10 wt %. The pH of this mixed solution is usually from 3 to 12, preferably from 5 to 9. If the pH is less than 3, a part of the hydrated zinc stannate formed, will be dissolved in the acid as a zinc salt, whereby the yield tends to be low, and if the pH exceeds 12, the stannate and the zincate partially remain unreacted, whereby the yield tends to be low, such being undesirable.

In step (a'), the aqueous medium may contain a hydroxycarboxylic acid, its salt or a mixture thereof in an amount of at most 1.5 mols, preferably from 0.05 to 1.5 mols, per mol of Sn in the stannate. By the addition of the hydroxycarboxylic acid or its salt, it is possible to obtain a hydrated zinc stannate sol having high dispersibility or transparency. Such a hydroxycarboxylic acid or its salt is water-soluble for use. The hydroxycarboxylic acid may, for example, be gluconic acid, tartaric acid or citric acid, and the salt of a hydroxycarboxylic acid may, for example, be an alkali metal salt, an ammonium salt or an organic basic salt of e.g. gluconic acid, tartaric acid or citric acid. The alkali metal salt may, for example, be sodium gluconate, and the organic basic salt may, for example, be propylamine gluconate. The hydroxycarboxylic acid or its salt may be added to any stage of steps (a') to (d'). However, it is preferably added before formation of agglomerates of colloidal particles of a hydrated zinc stannate or during the formation of such agglomerates, or to a sol obtained by peptizing the agglomerates. When added before forming agglomerates of colloidal particles of a hydrated zinc stannate, the hydroxycarboxylic acid or its salt may be incorporated into the aqueous medium by adding it to either the aqueous solution containing the zincate and the stannate or the aqueous acid solution having an aqueous hydrogen peroxide solution added thereto. However, the above hydroxycarboxylic acid or its salt is preferably added to the aqueous solution containing the zincate and the stannate in the method of dropwise adding the aqueous acid solution having an aqueous hydrogen peroxide solution aided thereto, to the aqueous solution containing the zincate and the stannate with stirring. Such a hydroxycarboxylic acid or its salt may be added to the aqueous solution containing the zincate and the stannate directly or in the form of an aqueous solution having a concentration of from 1 to 50 wt %.

In step (b'), the aqueous medium containing agglomerates of colloidal particles of a hydrated zinc stannate, obtained in step (a'), is heated for aging at a temperature of from 30 to 200° C., preferably from 60 to 100° C., for from 0.1 to 50 hours, preferably from 1 to 10 hours. If the temperature for heating exceeds 100° C., an autoclave or the like will be required. If the heating time for aging is less than 0.1 hour, the effects tend to be small, and the time may exceed 50 hours, but such is uneconomical.

In step (c'), an excess electrolyte such as cations (alkali metal ions) or anions (acid radicals) will be removed from the aqueous medium containing agglomerates of colloidal particles of a hydrated zinc stannate, obtained in step (b'). The electrolyte is removed by washing by such a method as decantation, centrifugal filtration or ultrafiltration. Removal by such a filtration method can be carried out usually at a temperature of at most 100° C., preferably from 25 to 60° C.

In step (d'), the aqueous medium (slurry) containing agglomerates of hydrated zinc stannate colloid having an excess electrolyte washed and removed, obtained in step (c'), is dispersed and peptized by an apparatus such as a disper, a sand grinder, an attriter or a ball mill to obtain a sol. Here, as a dispersing adjuvant, an inorganic base such as an alkali metal hydroxide or ammonia, or an organic base such as an amine, may be incorporated to adjust the pH, whereby it is possible to produce a sol having the particles of a hydrated zinc stannate dispersed in the aqueous medium, more efficiently. To the sol thus obtained, the above-mentioned hydroxycarboxylic acid, its salt or a mixture thereof, may be added in an amount of at most 1.5 mols, per mol of Sn of the hydrated zinc stannate.

The sol obtained in step (d') has a pH of from 3 to 12, preferably from 5 to 11 and contains the hydrated zinc stannate at a concentration of from 5 to 30 wt %. The hydrated zinc stannate particles in the sol thus obtained, have a primary particle diameter of from 2 to 200 nm and are represented by the formula $xZnO.ySnO_2.zH_2O$ wherein the molar ratio of x:y:z is 1:0.83 to 1.43:1.00 to 5.00.

In order to further reduce the electrolyte in the hydrated zinc stannate sol, the sol obtained in step (d') may be treated with a cation exchange resin or an anion exchange resin. The cation exchange resin is used in a hydroxyl group form, and a commercially available anion exchange resin may be employed. Anions can be readily removed, for example, by a method of passing the sol through a column packed with the anion exchange resin. Passing the sol through the column is carried out preferably at a temperature of from 0 to 60° C. at a space velocity (SV) of from 1 to 10 $hr^{-1}$. The cation exchange resin is used in a hydrogen form, and a commercially available cation exchange resin may be employed. Treatment with such a cation exchange resin may be carried out by directly adding a required amount of the cation exchange resin to the sol with stirring, whereby cations can be removed. By the removal of the excess electrolyte in step (c'), peptization in step (d') will be facilitated, whereby it is possible to obtain a hydrated zinc stannate sol of the present invention having excellent transparency and adequate stability with a pH of from 3 to 12. When it is desired to further increase the concentration of the sol obtained in step (d'), a further step may be added as step (e') wherein the sol can be concentrated to a level of 40 wt % by an addition of a stabilizer such as an organic base or an organic acid. The organic base to be used, may, for example, be an alkylamine, an alkanolamine or a quaternary ammonium hydroxide. For example, n-propylamine, isopropylamine, diisobutylamine, ethylenediamine, monoethanolamine or triethanolamine may be mentioned. The organic acid may, for example, be a hydroxycarboxylic acid such as glycolic acid, tartaric acid or citric acid. The aqueous medium of the aqueous sol obtained in step (d') or the subsequent step (e') may be substituted by a hydrophilic organic solvent in step (f') to obtain an organo sol. This substitution may be carried out by a conventional method such as distillation or ultrafiltration. The hydrophilic organic solvent may, for example, be a lower alcohol such as methanol, ethanol or isopropanol, a linear amide such as dimethylformamide or N,N'-dimethylacetamide, a cyclic amide such as N-methyl-2-pyrrolidone, a glycol ether such as ethyl CELLOSOLVE, or ethylene glycol. The particles in the organo sol obtained in step (f') have the same primary particle diameter and molar ratio as the particles in the aqueous sol obtained in step (e').

The sol having dispersed in a liquid medium particles of a hydrated zinc stannate according to the first aspect of the present invention can be prepared by a third process which is a combination of the first and second processes. Namely, the third process comprises (a") a step of neutralizing a stannate and a zincate with an acid and a zinc salt in an aqueous medium in the presence of hydrogen peroxide to obtain an aqueous medium containing agglomerates of colloidal particles of a hydrated zinc stannate having a Zn/Sn molar ratio of from 0.7 to 1.2, (b") a step of heating the aqueous medium containing agglomerates of colloidal particles of a hydrated zinc stannate, obtained in step (a"), at a temperature of from 30 to 200° C., (c") a step of removing an electrolyte from the aqueous medium containing agglomerates of colloidal particles of a hydrated zinc stannate obtained in step (b"), and (d") a step of peptizing the agglomerates of colloidal particles of a hydrated zinc stannate in the aqueous medium obtained in step (c").

In step (a") in the above third process, the reaction for neutralizing a zincate and a stannate with an acid and a zinc salt in the presence of hydrogen peroxide, is preferably carried out in an aqueous medium prepared by mixing an aqueous solution containing a zincate and a stannate with an aqueous solution of an acid and a zinc salt having an aqueous hydrogen peroxide added thereto.

Hydrated zinc silicates produced by conventional processes all form precipitates and have large diameters of from 0.3 to 1.0 μm, and they do not form sols even when excess electrolytes are removed by e.g. filtration and washing. If they are subjected to wet pulverization treatment by means of e.g. a sand grinder or an attriter, they may be able to be dispersed to form sols. However, even then, it is difficult to obtain sols having high levels of stability and transparency.

The sol having dispersed in a liquid medium particles of a hydrated zinc stannate according to the first aspect of the present invention, can be prepared by the first process wherein a zinc salt and a stannate are reacted in an aqueous medium in the presence of hydrogen peroxide, or the second process wherein a zincate and a stannate are neutralized with an acid in an aqueous medium in the presence of hydrogen peroxide. The hydrogen peroxide is capable of controlling particle size of the hydrated zinc stannate colloidal particles formed during the reaction, so that the colloidal particles will have a primary particle diameter of from about 2 to 200 nm, and even if they undergo secondary agglomeration, such agglomeration is so weak that after removal of an excess electrolyte, agglomerates may readily be peptized to obtain a hydrated zinc stannate sol. This is believed to be attributable to the fact that by the presence of hydrogen peroxide, the surface of stannic acid is in a peroxy state.

In the X-ray diffraction measurement, the hydrated zinc stannate particles in the sol obtained by the first process according to the first aspect of the present invention showed a pattern which agreed to the peak pattern of the hydrated zinc stannate (ASTM No. 20-1455, $ZnSnO_3.3H_2O$) disclosed in ASTM, Index to the X-ray Powder Data File Inorganic. They also showed a peak of a crystalline hydrated zinc stannate, but such a peak was very small, and it was confirmed that the particles were mostly amorphous hydrated zinc stannate.

Further, in the X-ray diffraction measurement, the hydrated zinc stannate particles in the sol obtained by the second process according to the first aspect of the present invention, show a pattern which agrees to the peak pattern of ASTM (No. 20-1455 $ZnSnO_3.3H_2O$), and they show a peak of crystalline hydrated zinc stannate. Thus, the particles obtained by the second process have high crystallizability.

The particles (i) made of an oxide of a metal having a valence of 3, 4 or 5, to be used in the second aspect of the present invention, have a primary particle diameter of from 4 to 50 nm, preferably from 4 to 30 nm. Here, the primary particle diameter is not a diameter of an agglomerated particle, but is a diameter of an individual particle when such an agglomerated particle has been dissociated into individual particles. Such a primary particle diameter can be measured by an electron microscope.

The oxide of a metal having a valence of 3, 4 or 5, may, for example, be an oxide of a metal such as aluminum, yttrium, antimony, indium, bismuth, titanium, zirconium, tin, cerium, tellurium, niobium or tantalum, such as $Al_2O_3$, $Y_2O_3$, $Sb_2O_3$, $In_2O_3$, $Bi_2O_3$, $TiO_2$, $ZrO_2$, $SnO_2$, $CeO_2$, $TeO_2$, $Sb_2O_5$, $Nb_2O_5$ or $Ta_2O_5$. These oxides may be used alone or in combination as a mixture of two or more of them. As such an oxide of a metal, an oxide of tin, zirconium, titanium or antimony is particularly preferred, and these oxides may be used alone or in combination as a mixture of two or more of them. In a case where two or more oxides are to be used, they may be employed as a mere mixture of such oxide particles, or they may have a structure in which the oxide particles are chemically bonded to each other. As a chemically bonded structure, colloidal particles of a composite having a structure in which colloidal particles of stannic oxide and colloidal particles of zirconium oxide are bonded in a $ZrO_2/SnO_2$ ratio of from 0.02 to 1.0 by weight of these oxides, may, for example, be used as the above particles (i).

The colloidal particles (i) of an oxide of a metal having a valence of 3, 4 or 5 are preferably used in the form of a sol having colloidal particles (i) having a primary particle diameter of from 4 to 50 nm, preferably from 4 to 30 nm, dispersed in a liquid medium by a conventional method such as an ion exchange method, a peptization method, a hydrolysis method or a reaction method.

The ion exchange method may, for example, be a method of treating an acidic salt of the above metal with a hydrogen form cation exchange resin or a method of treating a basic salt of the above metal with a hydroxyl group-form anion exchange resin. The peptization method may, for example, be a method wherein a gel obtained by neutralizing an acidic salt of the above metal with a base or a basic salt of the above metal with an acid, is washed and then peptized with an acid or a base. The hydrolysis method may, for example, be a method of hydrolyzing an alkoxide of the above metal, or a method of hydrolyzing a basic salt of the above metal under heating, followed by removal of an unnecessary acid. The reaction method may, for example, be a method of reacting a powder of the above metal with an acid.

As the medium for such a metal oxide sol, either water or a hydrophilic organic solvent may be used. However, an aqueous sol using water is preferred. Such a sol can be used as a stable sol at a pH of from 1 to 9. So long as the object of the second aspect of the present invention can be accomplished, any optional component such as an alkaline substance, an acidic substance or a hydroxycarboxylic acid to stabilize the sol may be incorporated to the metal oxide sol. The metal oxide sol may have a metal oxide content of from 0.5 to 50 wt %, preferably from 1 to 30 wt %. Further, so long as a stable sol of the second aspect of the present invention can be obtained, a mixture of two or more types of the above sols, may be employed.

The particles (ii) of a hydrated zinc stannate represented by the formula $xZnO.ySnO_2.zH_2O$ wherein the molar ratio of x:y:z is 1:0.83 to 1.43:1.00 to 5.00, to be used in the second aspect of the present invention, have a primary particle diameter of from 2 to 20 nm, preferably from 2 to 10 nm. The hydrated zinc stannate constituting the above particles represented by the general formula $xZnO.ySnO_2.zH_2O$ wherein x:y:z is 1:0.83 to 1.43:1.00 to 5.00, may be present in the form of $ZnSnO_3.zH_2O$ (which may also be represented by $ZnO.SnO_2.zH_2O$) wherein z is from 3.00 to 5.00 which corresponds to the general formula wherein $ZnO:SnO_2=1:1$ i.e. a fixed ratio, or $ZnO.(SnO_2)_a.zH_2O$ wherein a is from 0.83 to 1.43, and z is from 1.00 to 5.00, which corresponds to the general formula wherein $ZnO:SnO_2=1:0.83$ to 1.43 i.e. a non-fixed ratio.

The particles (ii) of the hydrated zinc stannate is preferably used in the form of a sol having dispersed in a liquid medium hydrated zinc stannate particles (ii) having a primary particle diameter of from 2 to 20 nm, preferably from 2 to 10 nm. The liquid medium may, for example, be an aqueous medium or a hydrophilic organic solvent such as methanol, ethanol or isopropanol.

The particles (ii) of the hydrated zinc stannate to be used in the second aspect of the present invention can be prepared by the processes disclosed in the first aspect of the present invention.

The particles (ii) of the hydrated zinc stannate having a primary particle diameter of from 2 to 200 nm obtained by the above processes, are preferably used within a range of the primary particle diameter being from 2 to 20 nm in the second aspect of the present invention.

The particles of a modified metal oxide having a primary particle diameter of from 4.5 to 100 nm according to the second aspect of the present invention, can be obtained by mixing 100 parts by weight of particles (i) made of an oxide of a metal having a valence of 3, 4 or 5, with 2 to 100 parts by weight of particles (ii) of a hydrated zinc stannate represented by the formula $xZnO \cdot ySnO_2 \cdot zH_2O$ wherein the molar ratio of x:y:z is 1:0.83 to 1.43:1.00 to 5.00. Such mixing is carried out by mixing a sol having dispersed in a liquid medium particles (i) of an oxide of a metal having a valence of 3, 4 and 5, with a sol having dispersed in a liquid medium particles (ii) of a hydrated zinc stannate represented by the formula $xZnO \cdot ySnO_2 \cdot zH_2O$ wherein the molar ratio of x:y:z is 1:0.83 to 1.43:1.00 to 5.00, whereby it is possible to obtain a stable sol of a modified metal oxide having the surface of the particles (i) coated with the particles (ii). In the second aspect of the present invention, the modified metal oxide particles comprising particles (i) of an oxide of a metal having a valence of 3, 4 or 5, as nuclei, and particles (ii) of a hydrated zinc stannate coated on the surface of the nuclei, has a nature of a hydrated zinc stannate.

In the above mixing, the sol of particles (i) can be used at a concentration of from 0.5 to 50 wt %, and the sol of particles (ii) can be used at a concentration of from 0.5 to 40 wt %. It is preferred to mix the sol of particles (i) and the sol of particles (ii) at a temperature of from 0 to 100° C., preferably from 20 to 60° C., for from 0.05 to 3 hours, preferably from 30 to 60 minutes. In such mixing, the particle diameter of particles (ii) is preferably equal to or smaller than the particle diameter of particles (i). The sol of a modified metal oxide particles according to the second aspect of the present invention, thus obtained by such mixing, has a solid content at a concentration of from 2 to 50 wt %, preferably from 10 to 40 wt %. Further, the excess electrolyte can be reduced by e.g. a ultrafiltration method or an ion exchange method, as a case requires.

When it is desired to increase the concentration, the sol of modified metal oxide particles thus obtained, can be concentrated to the maximum of 50 wt % by a conventional method such as distillation or ultrafiltration.

In the second aspect of the present invention, by carrying out the reaction for forming particles (ii) of a hydrated zinc stannate in the presence of a sol of particles (i) of an oxide of a metal having a valence of 3, 4 or 5, it is possible to obtain a sol of modified metal oxide particles of the present invention, wherein the surface of particles (i) as nuclei, is coated with particles (ii).

The particles of the modified metal oxide in the sol obtained according to the second aspect of the present invention, have a primary particle diameter of from 4.5 to 100 nm, as observed by an electron microscope. The sol of the modified metal oxide particles has a pH of from 3 to 12. To adjust the pH within this range, it is preferred to adjust the pH by adding an amine or a hydroxycarboxylic acid after mixing the sol of particles (i) and the sol of particles (ii), or after concentrating the modified metal oxide sol.

When the sol of the modified metal oxide particles thus obtained is an aqueous sol, the aqueous medium may be substituted by a hydrophilic organic solvent by a distillation method or an ultrafiltration method. Such a hydrophilic organic solvent may, for example, be a lower alcohol such as methanol, ethanol or isopropanol, a linear amide such as dimethylformamide or N,N'-dimethylacetamide, a cyclic amide such as N-methyl-2-pyrrolidone, a glycol ether such as ethyl CELLOSOLVE, or ethylene glycol.

The colloidal particles of an oxide of a metal having a valence of 3, 4 or 5, having its surface coated and modified by colloidal particles of a hydrated zinc stannate, are excellent in water resistance, since their dried product will not be dissolved or peptized in water. Further, the hydrated zinc stannate particles are excellent in light resistance, and a coating film obtainable by coating and curing such hydrated zinc stannate particles on a substrate as a component of a hard coating agent, will not undergo a color change even if exposed to ultraviolet rays or the like and thus will be excellent in light resistance. Even when converted to an organo sol of a modified metal oxide by substituting the aqueous medium by an organic solvent, the aqueous sol of the modified metal oxide will maintain the structure having the surface of particles (i) coated with particles (ii) without being separated into particles (i) made of an oxide of a metal having a valence of 3, 4 or 5 and particles (ii) of a hydrated zinc stannate. Thus, the particles (i) and the particles (ii) are considered to be bonded by a chemical bond.

If the hydrated zinc stannate is less than 2 parts by weight per 100 parts by weight of the above metal oxide when the sol of colloidal particles (i) made of an oxide of a metal having a valence of 3, 4 or 5 is mixed with the sol of colloidal particles (ii) of a hydrated zinc stannate, a stable sol can hardly be obtained. This indicates that when the amount of colloidal particles of the hydrated zinc stannate is insufficient, the coating of the surface of the metal oxide colloidal particles as nuclei with such colloidal particles will be insufficient, and coagulation of formed colloidal particles will be likely to occur, the resulting sol tends to be instable, and the water resistance or light resistance of a coating film obtained by coating and curing such particles as a component of a hard coating agent on a substrate, will be inadequate. Accordingly, the amount of the hydrated zinc stannate to be mixed, may be smaller than the amount to cover the entire surface of the colloidal particles of the oxide of a metal having a valence of 3, 4 or 5, but should be at least the minimum amount required to certainly form a stable sol of colloidal particles of the modified metal oxide. If the colloidal particles of the hydrated zinc stannate are used for the above mixing in an amount exceeding the amount required for such surface coating, the resulting sol is nothing but a stable sol mixture comprising the sol of colloidal particles of the hydrated zinc stannate and the sol of colloidal particles of the formed modified metal oxide.

To modify the colloidal particles of the metal oxide by their surface coating, the amount of the colloidal particles of the hydrated zinc stannate to be used, is preferably at most 100 parts by weight, per 100 parts by weight of the particles of the oxide of a metal having a valence of 3, 4 or 5. A preferred aqueous sol of the modified metal oxide according to the second aspect of the present invention, has a pH of from 3 to 12. If the pH is lower than 3, the hydrated zinc stannate covering the colloidal particles of the modified metal oxide tends to be easily dissolved in a liquid, such being undesirable. Further, if the pH exceeds 12, the hydrated zinc stannate covering the colloidal particles of the modified metal oxide, likewise tends to be easily dissolved in a liquid, such being undesirable.

Further, the sol of the modified metal oxide colloidal particles tends to be unstable also when the total concentration of the oxide of a metal having a valence of 3, 4 or 5 and the hydrated zinc stannate as calculated as ZnO and $SnO_2$, exceeds 50 wt %. The concentration preferred for an industrial product is from about 10 to 40 wt %. When the sol of the oxide of a metal having a valence of 3, 4 or 5 is mixed with the hydrated zinc stannate sol, if each of the metal oxide concentration and the hydrated zinc stannate concentration in these sols, exceeds 50 wt %, a viscosity increase or gelation is likely to occur during the mixing, such being undesirable. It is rather preferred to employ the sols having low concentrations. However, if the concentrations are too low, the amount of liquid to be removed at the time of concentrating the obtained sol, will increase, such being undesirable. Further, if the temperature is 100° C. or higher at the time of mixing, a viscosity increase is likely to occur, such being undesirable.

In the second aspect of the present invention, if the oxide of a metal having a valence of 3, 4 or 5 is an oxide of Sn, an oxide of Zr, an oxide of Ti, an oxide of Sb or a mixture thereof, the sol of particles (i) which will become nuclei, will be $SnO_2$ sol, $ZrO_2$ sol, $TiO_2$ sol or $Sb_2O_5$ sol. These sols are satisfactory with respect to the stability and the size of colloidal particles. Further, the modified metal oxide colloidal particles prepared from these sols, have adequate stability, and a product obtained by coating and curing such modified metal oxide colloidal particles on a substrate as a component of a hard coating agent, has a high refractive index.

The modified metal oxide sol according to the second aspect of the present invention may be prepared by a method wherein a sol of particles (i) of an oxide of a metal having a valence of 3, 4 or 5 and a sol of particles (ii) of a hydrated zinc stannate are prepared separately, and then they are mixed, or a method wherein a sol of particles (ii) is prepared in a sol of particles (i).

The formula (I) for component (A) to be used for the coating compositions according to the third and fourth aspects of the present invention:

$$(R^1)_a(R^3)_b Si(OR^2)_{4-(a+b)} \quad (I)$$

includes an organic silicon compound wherein $R^1$ and $R^3$ are the same organic groups or different organic groups, and a and b are the same integers or different integers. The organic silicon compound of the formula (I) for component (A) includes, for example, tetramethoxysilane, tetraethoxysilane, tetra n-propoxysilane, tetraisopropoxysilane, tetra n-butoxysilane, tetracetoxysilane, methyltrimethoxysilane, methyltripropoxysilane, methyltriacetoxysilane, methyltributoxysilane, methyltripropoxysilane, methyltriamyloxysilane, methyltriphenoxysilane, methyltribenzyloxysilane, methyltriphenetyloxysilane, glycidoxymethyltrimethoxysilane, glycidoxymethyltriethoxysilane, α-glycidoxyethyltrimethoxysilane, α-glycidoxyethyltriethoxysilane, β-glycidoxyethyltrimethoxysilane, β-glycidoxyethyltriethoxysilane, α-glycidoxypropyltrimethoxysilane, α-glycidoxypropyltriethoxysilane, β-glycidoxypropyltrimethoxysilane, β-glycidoxypropyltriethoxysilane, γ-glycidoxypropyltrimethoxysilane, γ-glycidoxypropyltriethoxysilane, γ-glycidoxypropyltripropoxysilane, γ-glycidoxypropyltributoxysilane, γ-glycidoxypropyltriphenoxysilane, α-glycidoxybutyltrimethoxysilane, α-glycidoxybutyltriethoxysilane, β-glycidoxybutyltriethoxysilane, γ-glycidoxybutyltrimethoxysilane, γ-glycidoxybutyltriethoxysilane, δ-glycidoxybutyltrimethoxysilane, δ-glycidoxybutyltriethoxysilane, (3,4-epoxycyclohexyl)methyltrimethoxysilane, (3,4-epoxycyclohexyl)methyltriethoxysilane, β-(3,4-epoxycyclohexyl)ethyltrimethoxysilane, β-(3,4-epoxycyclohexyl)ethyltriethoxysilane, β-(3,4-epoxycyclohexyl)ethyltripropoxysilane, β-(3,4-epoxycyclohexyl)ethyltributoxysilane, β-(3,4-epoxycyclohexyl)ethyltriphenoxysilane, γ-(3,4-epoxycyclohexyl)propyltrimethoxysilane, γ-(3,4-epoxycyclohexyl)propyltriethoxysilane, δ-3,4-epoxycyclohexyl)butyltrimethoxysilane, δ-(3,4-epoxycyclohexyl)butyltriethoxysilane, glycidoxymethylmethyldimethoxysilane, glycidoxymethylmethyldiethoxysilane, α-glycidoxyethylmethyldimethoxysilane, α-glycidoxyethylmethyldiethoxysilane, β-glycidoxyethylmethyldimethoxysilane, β-glycidoxyethylethyldimethoxysilane, α-glycidoxypropylmethyldimethoxysilane, α-glycidoxypropylmethyldiethoxysilane, β-glycidoxypropylmethyldimethoxysilane, β-glycidoxypropylethyldimethoxysilane, γ-glycidoxypropylmethyldimethoxysilane, γ-glycidoxypropylmethyldiethoxysilane, γ-glycidoxypropylmethyldipropoxysilane, γ-glycidoxypropylmethyldibutoxysilane, γ-glycidoxypropylmethyldiphenoxysilane, γ-glycidoxypropylethyldimethoxysilane, γ-glycidoxypropylethyldiethoxysilane, γ-glycidoxypropylvinyldimethoxysilane, γ-glycidoxypropylvinyldiethoxysilane, ethyltrimethoxysilane, ethyltriethoxysilane, vinyltrimethoxysilane, vinyltriethoxysilane, vinyltriacetoxysilane, phenyltrimethoxysilane, phenyltriethoxysilane, phenyltriacetoxysilane, γ-chloropropyltrimethoxysilane, γ-chloropropyltriethoxysilane, γ-chloropropyltriacetoxysilane, 3,3,3-trifluoropropyltrimethoxysilane, γ-methacryloxypropyltrimethoxysilane, γ-mercaptopropyltrimethoxysilane, γ-mercaptopropyltriethoxysilane, β-cyanoethyltriethoxysilane, chloromethyltrimethoxysilane, chloromethyltriethoxysilane, N-(β-aminoethyl)γ-aminopropyltrimethoxysilane, N-(β-aminoethyl)γ-aminopropylmethyldimethoxysilane, γ-aminopropylmethyldimethoxysilane, N-(β-aminoethyl)γ-aminopropyltriethoxysilane, N-(β-aminoethyl)γ-aminopropylmethyldimethoxysilane, dimethyldimethoxysilane, phenylmethyldimethoxysilane, dimethyldiethoxysilane, phenylmethyldiethoxysilane, γ-chloropropylmethyldimethoxysilane, γ-chloropropylmethyldiethoxysilane, dimethyldiacetoxysilane, γ-methacryloxypropylmethyldimethoxysilane, γ-methacryloxypropylmethyldiethoxysilane, γ-mercaptopropylmethyldimethoxysilane, γ-mercaptopropylmethyldiethoxysilane, methylvinyldimethoxysilane, and methylvinyldiethoxysilane. These organic silicon compounds may be used alone or in combination as a mixture of two or more of them.

The hydrolyzates of organic silicon compounds of the formula (I) for component (A) to be used for the coating compositions according to the third and fourth aspects of the present invention, are compounds obtained by hydrolysis of the organic silicon compounds of the formula (I) so that a part or all of $R^2$ is substituted by hydrogen atoms. Such hydrolyzates of the organic silicon compounds of the formula (I) may be used alone or in combination as a mixture of two or more of them. The hydrolysis is carried out by adding an aqueous acidic solution such as an aqueous hydrochloric acid solution, an aqueous sulfuric acid solution or an aqueous acetic acid solution to the organic silicon compound, followed by stirring.

The organic silicon compound of the formula (II):

$$[(R^4)_c Si(Ox)_{3-c}]_2 Y \qquad (II)$$

for component (A) to be used for the coating compositions according to the third and fourth aspects of the present invention, includes, for example, methylenebismethyldimethoxysilane, ethylenebisethyldimethoxysilane, propylenebisethyldiethoxysilane, and butylenebismethyldiethoxysilane. These organic silicon compounds may be used alone or in combination as a mixture of two or more of them.

The hydrolyzates of organic silicon compounds of the formula (II) for component (A) to be used for the coating compositions according to the third and fourth aspects of the present invention, are compounds obtained by hydrolysis of the organic silicon compounds of the formula (II) so that a part or all of X is substituted by hydrogen atoms. Such hydrolyzates of the organosilicon compounds of the formula (II) may be used alone or in combination as a mixture of two or more of them. The hydrolysis is carried out by adding an aqueous acidic solution such as an aqueous hydrochloric acid solution, an aqueous sulfuric acid solution or an aqueous acetic acid solution to the organic silicon compound, followed by stirring.

Component (A) to be used for the coating compositions according to the third and fourth aspects of the present invention, is at least one silicon-containing substance selected from the group consisting of organic silicon compounds of the formulas (I) and (II) and their hydrolyzates.

Component (A) to be used for the coating compositions according to the third and fourth aspects of the present invention, is preferably at least one silicon-containing substance selected from the group consisting of organic silicon compounds of the formula (I) and their hydrolyzates. Particularly preferred are organic silicon compounds of the formula (I) wherein either one of $R^1$ and $R^3$ is an organic group having an epoxy group, $R^2$ is an alkyl group, and each of a and b is 0 or 1, provided that a+b is 1 or 2, and their hydrolyzates.

Examples of such preferred organic silicon compounds include glycidoxymethyltrimethoxysilane, glycidoxymethyltriethoxysilane, α-glycidoxyethyltrimethoxysilane, α-glycidoxyethyltriethoxysilane, β-glycidoxyethyltrimethoxysilane, β-glycidoxyethyltriethoxysilane, α-glycidoxypropyltrimethoxysilane, α-glycidoxypropyltriethoxysilane, β-glycidoxypropyltrimethoxysilane, β-glycidoxypropyltriethoxysilane, γ-glycidoxypropyltrimethoxysilane, γ-glycidoxypropyltriethoxysilane, γ-glycidoxypropyltripropoxysilane, γ-glycidoxypropyltributoxysilane, γ-glycidoxypropyltriphenoxysilane, α-glycidoxybutyltrimethoxysilane, α-glycidoxybutyltriethoxysilane, β-glycidoxybutyltriethoxysilane, γ-glycidoxybutyltrimethoxysilane, γ-glycidoxybutyltriethoxysilane, δ-glycidoxybutyltrimethoxysilane, δ-glycidoxybutyltriethoxysilane, glycidoxymethylmethyldimethoxysilane, glycidoxymethylmethyldiethoxysilane, α-glycidoxyethylmethyldimethoxysilane, α-glycidoxyethylmethyldiethoxysilane, β-glycidoxyethylmethyldimethoxysilane, β-glycidoxyethylethyldimethoxysilane, α-glycidoxypropylmethyldimethoxysilane, α-glycidoxypropylmethyldiethoxysilane, β-glycidoxypropylmethyldimethoxysilane, β-glycidoxypropylethyldimethoxysilane, γ-glycidoxypropylmethyldimethoxysilane, γ-glycidoxypropylmethyldiethoxysilane, γ-glycidoxypropylmethyldipropoxysilane, γ-glycidoxypropylmethyldibutoxysilane, γ-glycidoxypropylmethyldiphenoxysilane, γ-glycidoxypropylethyldimethoxysilane, γ-glycidoxypropylethyldiethoxysilane, γ-glycidoxypropylvinyldimethoxysilane, and γ-glycidoxypropylvinyldiethoxysilane.

More preferred are γ-glycidoxypropyltrimethoxysilane, γ-glycidoxypropylmethyldiethoxysilane and their hydrolyzates, and they may be used alone or in combination as a mixture. Further, γ-glycidoxypropyltrimethoxysilane, γ-glycidoxypropylmethyldiethoxysilane or a hydrolyzate thereof may be used in combination with a tetrafunctional compound of the formula (I) wherein a+b=0. Examples of the tetrafunctional compound includes tetramethoxysilane, tetraethoxysilane, tetraisopropoxysilane, tetra n-propoxysilane, tetra n-butoxysilane tetra tert-butoxysilane and tetra sec-butoxysilane.

Component (B) to be used for the coating composition according to the third aspect of the present invention, is particles of a hydrated zinc stannate having a primary particle diameter of from 2 to 200 nm and represented by the formula $xZnO \cdot ySnO_2 \cdot zH_2O$ wherein the molar ratio of x:y:z is 1:0.83 to 1.43:1.00 to 5.00.

The above particles of a hydrated zinc stannate are preferably employed in the form of a sol having particles of the hydrated zinc stannate dispersed in a liquid medium. The liquid medium for dispersing the particles of the hydrated zinc stannate, may, for example, be an aqueous medium or a hydrophilic organic solvent such as methanol, ethanol or isopropanol. However, a hydrophilic organic solvent such as methanol, ethanol or isopropanol, is particularly preferred. The particles of the hydrated zinc stannate have a primary particle diameter of from 2 to 200 nm, preferably from 5 to 100 nm. The particles of the hydrated zinc stannate disclosed in the first aspect of the present invention can be used for the particles of the hydrated zinc stannate to be used in the third aspect of the present invention. Further, they may be prepared by the same method as disclosed in the first aspect of the present invention.

Component (B') to be used for the coating composition according to the fourth aspect of the present invention, is particles of a modified metal oxide which comprise particles (i) made of an oxide of a metal having a valence of 3, 4 or 5, as nuclei, and particles (ii) of a hydrated zinc stannate of the formula $xZnO \cdot ySnO_2 \cdot zH_2O$ wherein the molar ratio of x:y:z is 1:0.83 to 1.43:1.00 to 5.00, coated on the surface of the nuclei, and which have a primary particle diameter of from 4.5 to 100 nm.

Such particles of the modified metal oxide are preferably used in the form of a sol having the particles of the modified metal oxide dispersed in a liquid medium.

Here, the primary particle diameter is not a diameter of an agglomerated particle, but a diameter of an individual particle when such an agglomerated particle has been dissociated into individual particles. Such a primary particle diameter can be measured by an electron microscope.

The particles (i) made of an oxide of a metal having a valence of 3, 4 or 5 for the component (B') to be used in the fourth aspect of the present invention, have a primary particle diameter of from 4 to 50 nm, preferably from 4 to 30 nm. The particles (ii) of a hydrated zinc stannate of the formula $xZnO \cdot ySnO_2 \cdot zH_2O$ wherein the molar ratio of x:y:z is 1:0.83 to 1.43:1.00 to 5.00, for component (B') to be used in the fourth aspect of the present invention, have a primary particle diameter of from 2 to 20 nm, preferably from 2 to 10 nm. The hydrated zinc stannate constituting the above particles is represented by the general formula $xZnO \cdot ySnO_2 \cdot zH_2O$ wherein x:y:z is 1:0.83 to 1.43:1.00 to 5.00, and may, for example, be present in the form of $ZnSnO_3 \cdot zH_2O$ (which may be represented also by $ZnO \cdot SnO_2 \cdot zH_2O$) wherein z is from 3.00 to 5.00 which corresponds to the general formula wherein $ZnO:SnO_2=1:1$ i.e. a fixed ratio, or $ZnO \cdot (SnO_2)_a \cdot zH_2O$ wherein a is from 0.83 to 1.43, and z is from 1.00 to 5.00, which corresponds to the general formula wherein $ZnO:SnO_2=1:0.83$ to 1.43 i.e. a non-fixed ratio.

The above particles (ii) of the hydrated zinc stannate are preferably used in the form of a sol having dispersed in a liquid medium the hydrated zinc stannate particles (ii) having a primary particle diameter of from 2 to 20 nm, preferably from 2 to 10 nm. Such a liquid medium may, for example, be an aqueous medium, or a hydrophilic organic solvent such as methanol, ethanol or isopropanol.

The modified metal oxide particles disclosed in the second aspect of the present invention may be used for the modified metal oxide particles for component (B') to be used in the fourth aspect of the present invention, and they may be prepared in the same method as disclosed in the second aspect of the present invention.

The coating compositions according to the third and fourth aspects of the present invention, may contain, as component (C), at least one metal compound selected from the group consisting of metal salts, metal alkoxides and metal chelates, as a curing catalyst. By incorporation of such component (C), the curing reaction may be accelerated when the coating composition according to the third or fourth aspect of the present invention is coated and cured on the surface of an optical element, whereby a sufficiently cured film can be obtained in a short period of time.

Such component (C) may, for example, be an alkali metal salt, an alkaline earth metal salt or a polyvalent metal salt of e.g. an organic carboxylic acid, chromic acid, hypochlorous acid, boric acid, perchloric acid, bromic acid, celenious acid, thiosulfuric acid, orthosilicic acid, thiocyanic acid, nitrous acid, aluminic acid or carbonic acid, or an alkoxide or chelate of a metal such as aluminum, zirconium or titanium. Particularly preferred as component (C) is a metal chelate compound. The metal chelate compound may, for example, be an acetylacetonate complex such as aluminum acetylacetonate. An anion having one proton dissociated from a $CH_2$ group of acetylacetone $CH_3COCH_2COCH_3$, is an acetylacetonate ligand (abbreviated as acac), and the aluminum acetylacetonate has a structure of $Al(acac)_3$.

Further, as such component (C), amines such as allylamine and ethylamine, or various acids and bases including Lewis acids and Lewis bases, may also be employed.

The coating compositions according to the third and fourth aspects of the present invention may contain fine particulate metal oxides to adjust the refractive indices to various optical elements such as lenses. Such fine particulate metal oxides include, for example, aluminum oxide, titanium oxide, antimony oxide, zirconium oxide, silicon oxide and cerium oxide.

Further, the coating compositions according to the third and fourth aspects of the present invention may contain various surfactants to improve the wettability when they are coated on the surface of optical elements, or to improve the flatness of the films obtained by curing. Further, an ultraviolet absorber, an antioxidant or the like may also be incorporated so long as such an additive will not adversely affect the physical properties of the film.

The coating composition according to the third or fourth aspect of the present invention may comprise 100 parts by weight of the silicon-containing substance of component (A) and from 1 to 500 parts by weight, preferably from 100 to 300 parts by weight, of the hydrated zinc stannate colloidal particles of component (B) or the modified metal oxide particles of component (B'). If the hydrated zinc stannate colloidal particles of component (B) or the modified metal oxide particles of component (B') are less than 1 part by weight, the refractive index of the resulting film tends to be low, whereby the range for application to base materials will be very limited. On the other hand, if they exceed 500 parts by weight, cracks are likely to form between the cured film and the base material, and the possibility of lowering the transparency increases, such being undesirable.

In the third or fourth aspect of the present invention, an optical element will be obtained which has on its surface a cured film made of the above coating composition. As a method for forming the cured film made of the above coating composition on an optical element, a method may be mentioned in which the above coating composition is coated on the optical element, followed by curing. As a coating means, a conventional method such as a dipping method, a spin coating method or a spray coating method, may be employed. However, a dipping method or a spin coating method is particularly preferred from the viewpoint of the surface smoothness of the film thereby obtained.

Further, adhesion between the optical element and the cured film may be improved by applying chemical treatment by means of an acid, an alkali or various organic solvents, physical treatment by means of ultraviolet rays, washing treatment by means of various washing agents or primer treatment by means of various resins, prior to coating the above coating composition to the optical element.

The coating composition according to the third or fourth aspect of the present invention can be formed into a cured film by coating it on an optical element, followed by curing. Curing of the above coating composition may be carried out by hot air drying or irradiation with active energy rays. When hot air drying is employed, curing is preferably conducted in a hot air of from 70 to 200° C., more preferably from 90 to 150° C. As the active energy rays, far infrared rays may be used, whereby damage due to heat can be suppressed to a low level.

In the third or fourth aspect of the present invention, an optical element can be obtained which has on its surface a laminated film comprising a cured film made of the above coating composition and an antireflection film.

The antireflection film may be formed on the cured film made of the above coating composition. This antireflection film is preferably a multilayer film, which may be prepared by alternately laminating a low refractive index film and a high refractive index film. The high refractive index film to be used for this antireflection film may, for example, be a zirconium oxide vapor deposition film or a mixed vapor deposition film of metal oxides having tantalum oxide and yttrium oxide incorporated to zirconium oxide. The low refractive index film to be used for this antireflection film may, for example, be a vapor deposition film of silica. Such a zirconium oxide vapor deposition film or a mixed vapor deposition film of metal oxides having tantalum oxide and yttrium oxide incorporated to zirconium oxide, may be formed in such a manner that a zirconium oxide powder alone, or a zirconium oxide powder having a tantalum oxide powder and an yttrium oxide powder mixed thereto, is formed into a pellet by e.g. pressing by a press or sintering, and the pellet is vapor-deposited by an electron beam heating method on the film made of the above coating composition, to form an antireflection film.

Further, the cured film made of the coating composition according to the third or fourth aspect of the present invention has a high refractive index and thus is useful by itself as an antireflection film. Furthermore, by incorporating a functional component for e.g. antifogging, photochromic or stain proofing, it may also be used as a multifunctional film.

The optical element to be used in the third and fourth aspects of the present invention is preferably a transparent plastic molded product. Such a transparent plastic may, for example, be lenses for eyeglasses, lenses for cameras, window glasses for automobiles or optical filters for liquid crystal display or plasma display devices.

The coating composition of the present invention comprises at least one silicon-containing substance selected from the group consisting of the organic silicon compounds of the formulas (I) and (II) and their hydrolyzates, as component (A), and particles of the hydrated zinc stannate, as component (B), or particles of the modified metal oxide, as component (B'). The coating composition of the present invention can be prepared by hydrolyzing the organic silicon compound of component (A) with an aqueous acidic solution and mixing it with an organo sol of the hydrated zinc stannate of component (B), or with an organo sol of the modified metal oxide of component (B'). Such an organo sol is preferably a sol having particles of the hydrated zinc stannate or particles of the modified metal oxide dispersed in a methanol solvent.

The above coating composition is coated on an optical element, followed by curing, to obtain an optical element with a coating having a high transparency and good appearance, which is excellent in scratch resistance, surface hardness, abrasion resistance, transparency, heat resistance, light resistance and weather resistance, particularly in water resistance, and yet is free from interference fringes even when coated on an element having a high refractive index of at least 1.54.

Figure 1:
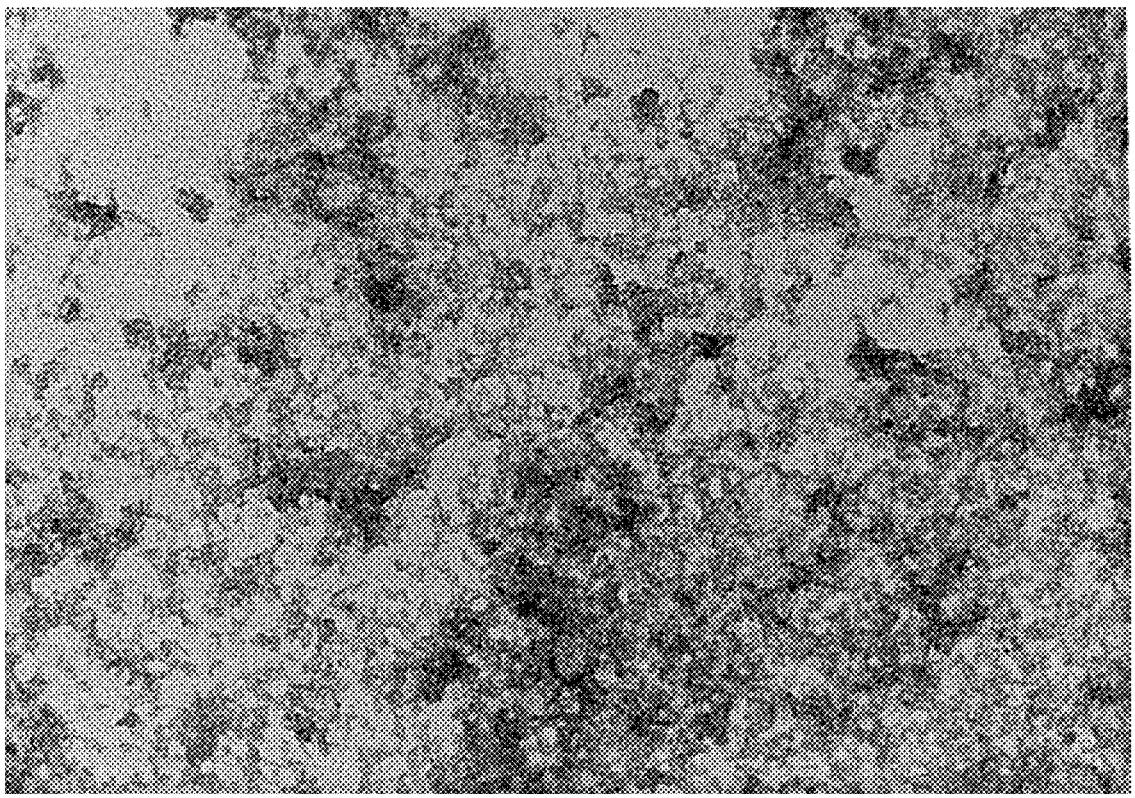
FIG. 1 is a transmission electron microscopic photograph showing the structure of particles of the hydrated zinc stannate sol prepared in Preparation Example 2, with 200,000 magnifications.

Now, the present invention will be described in further detail with reference to Examples. However, it should be understood that the present invention is by no means restricted to such specific Examples.

PREPARATION EXAMPLE 1

146.8 g of sodium stannate ($Na_2SnO_3 \cdot 3H_2O$, manufactured by Showa Kako K. K., containing 55 wt % as $SnO_2$) was dissolved in 2,391.8 g of water to obtain an aqueous sodium stannate solution (containing 3.3 wt % as $SnO_2$), and 51.4 g of sodium gluconate was added thereto to obtain 2,500 g of an aqueous solution of sodium stannate/sodium gluconate mixture. Separately, 63.5 g of zinc chloride ($ZnCl_2$) was dissolved in 1,686.5 g of water to obtain an aqueous zinc chloride solution, and 750 g of an aqueous hydrogen peroxide solution having a concentration of 35 wt % was added thereto to obtain 2,500 g of an aqueous solution of zinc chloride/hydrogen peroxide mixture.

Step (a)

By means of a quantitative pump, the aqueous solution of zinc chloride/hydrogen peroxide mixture prepared as described above, was added and reacted to the aqueous solution of sodium stannate/sodium gluconate mixture over a period of about one hour to obtain a hydrated zinc stannate colloidal solution. This hydrated zinc stannate colloidal solution had a pH of 8.5, a hydroxycarboxylic acid/$SnO_2$ molar ratio of 0.44, a $H_2O_2$ content of 5.25 wt %, a $ZnO/SnO_2$ molar ratio of 0.87 and a concentration of 2.4 wt % as calculated as $ZnO+SnO_2$.

Step (b)

200 g of 5 wt % hydrochloric acid was added to the hydrated zinc stannate colloidal solution obtained in step (a) to adjust the pH to about 6 and then heated at 90° C. for 5 hours for aging. After cooling, 25.3 g of isopropylamine was added thereto, and the mixture was subjected to stirring by a disper for 8 hours for peptization to obtain 5,225.3 g of a hydrated zinc stannate colloidal solution. This (colloidal solution had a pH of 9.32, an electrical conductivity of 24.2 ms/cm and a concentration of 2.3 wt % as calculated as $ZnO+SnO_2$.

Step (c)

An excess electrolyte in the hydrated zinc stannate colloidal solution obtained in step (b) was removed by washing with water by an ultrafiltration method using 36 l of water, to obtain 2,572 g of a hydrated zinc stannate sol. Hydrated zinc stannate particles in this sol had a primary particle diameter of 5 nm as observed by a transmission electron microscope and a $ZnO/SnO_2$ molar ratio of 0.70. Further, in the formula $xZnO.ySnO_2.zH_2O$, x:y:z was 1:1.43:3.90. 50 ml of a cation exchange resin (Amberlite IR-120B, used in a hydrogen form) was added to this sol, followed by stirring, to further remove cations. The cation exchange resin was separated therefrom to obtain 2,937 g of a sol. The obtained sol had a pH of 7.44 and an electrical conductivity of 172 µs/cm.

Step (d)

0.5 g of isopropylamine was added to the sol obtained in step (c), followed by concentration under reduced pressure by means of a rotary evaporator to obtain 1,009 g of a concentrated sol. The obtained sol had a pH of 8.00, an electrical conductivity of 403 µs/cm and a concentration of 11.2 wt % as calculated as $ZnO+SnO_2$, and the yield was 95%. This sol was dried at 110° C., and the refractive index of the dried product was 1.70, and from the X-ray diffraction analysis, the product was found to be an amorphous hydrated zinc stannate.

Step (e)

8.3 g of diisobutylamine and 5.1 g of citric acid were added to the sol obtained in step (d) with stirring, to obtain an adjusted sol. Then, the adjusted sol was introduced into a rotary evaporator, and while gradually adding 21 l of methanol, water in the sol was distilled off under reduced pressure, to obtain 495.6 g of a hydrated zinc stannate methanol sol. The obtained sol had a specific gravity of 0.960, a viscosity of 21.0 mPa.s, a pH (1+1) of 8.60, an electrical conductivity (1+1) of 446.5 µs/cm, a concentration of 22.8 wt % as calculated as $ZnO+SnO_2$ and a water content of 0.86 wt %. Hydrated zinc stannate particles in this sol had a primary particle diameter of 5 nm as observed by a transmission electron microscope and a $ZnO/SnO_2$ molar ratio of 0.70. Further, in the formula $xZnO.ySnO_2.zH_2O$, x:y:z was 1:1.43:3.90.

PREPARATION EXAMPLE 2

147.0 g of sodium stannate ($Na_2SnO_3.3H_2O$, manufactured by Showa Kako K. K., containing 55 wt % as $SnO_2$) was dissolved in 1,945.7 g of water to obtain an aqueous sodium stannate solution (containing 3.3 wt % as $SnO_2$), and 63.0 g of an aqueous gluconic acid solution (manufactured by Fujisawa Pharmaceutical Co., Ltd., content: 50 wt %) was added thereto to obtain 2,155.7 g of an aqueous solution of sodium stannate/gluconic acid mixture. Separately, 65.9 g of zinc chloride ($ZnCl_2$) was dissolved in 1,302.8 g of water to obtain an aqueous zinc chloride solution, and 750 g of a 35 wt % hydrogen peroxide aqueous solution was added thereto to obtain 2,118.7 g of an aqueous solution of zinc chloride/hydrogen peroxide mixture.

Step (a)

By means of a quantitative pump, the aqueous solution of zinc chloride/hydrogen peroxide mixture prepared as described above, was added and reacted to the aqueous solution of sodium stannate/gluconic acid mixture over a period of about one hour, with stirring by a disper, to obtain a hydrated zinc stannate colloidal solution. This hydrated zinc stannate colloidal solution had a pH of 6.8, a hydroxycarboxylic acid/$SnO_2$ molar ratio of 0.30, a $H_2O_2$ content of 6.13 wt %, a $ZnO/SnO_2$ molar ratio of 0.90 and a concentration of 2.8 wt % as calculated as $ZnO+SnO_2$.

Step (b)

The hydrated zinc stannate colloidal solution obtained in step (a) was heated at 92° C. for 5 hours for aging. After cooling, 25.0 g of isopropylamine was added thereto, and the mixture was stirred for 8 hours by a disper to obtain 4,306.9 g of a hydrated zinc stannate colloidal solution. This colloidal solution had a pH of 9.28, an electrical conductivity of 24.7 ms/cm and a concentration of 2.78 wt % as calculated as $ZnO+SnO_2$.

Step (c)

Figure 3:
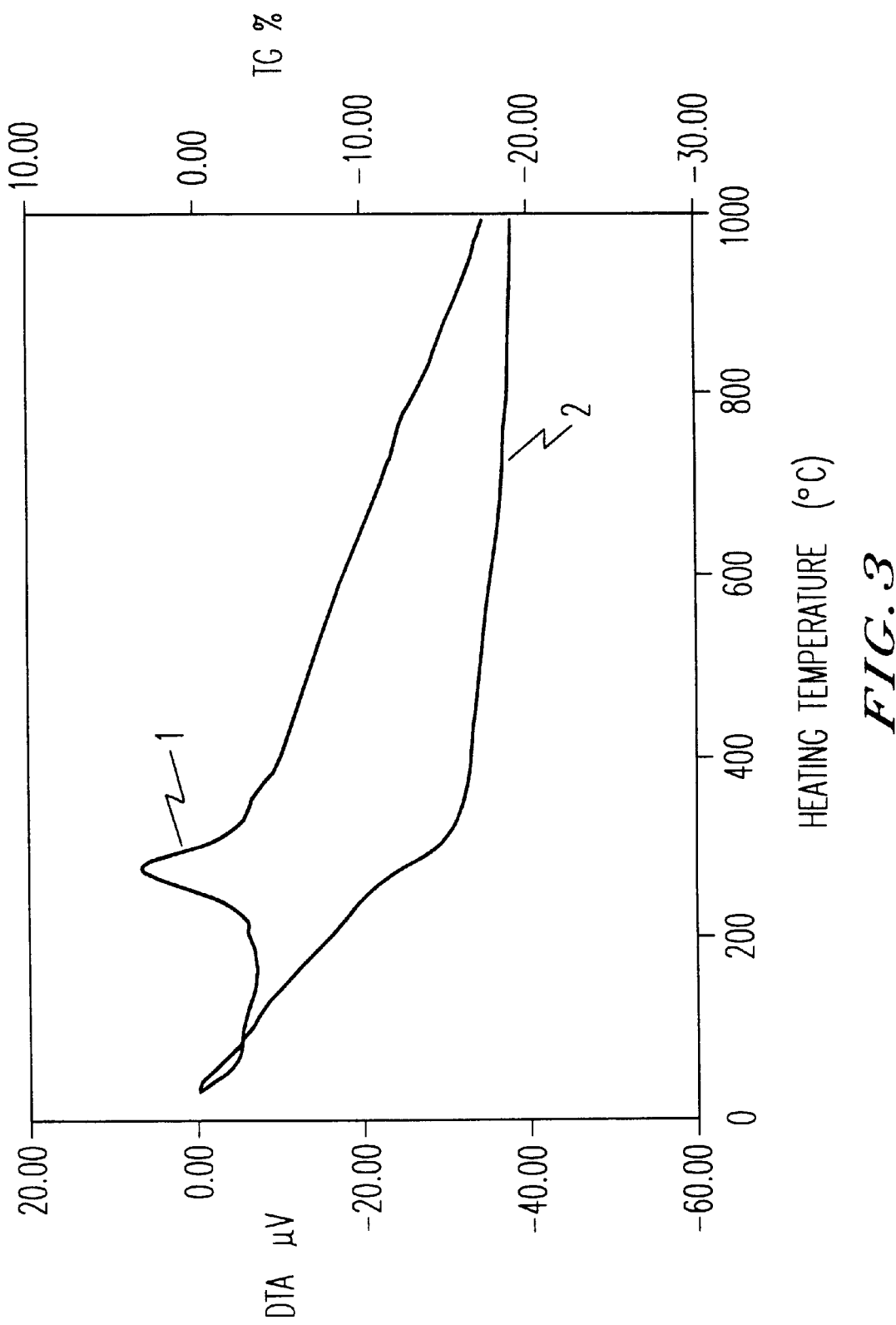
FIG. 3 is a differential thermal analysis of the powder obtained by drying the hydrated zinc stannate sol prepared in Preparation Example 2, at a temperature of 110° C.

An excess electrolyte in the hydrated zinc stannate colloidal solution obtained in step (b) was removed by washing with water by an ultrafiltration method using 30 l of water, to obtain 2,792 g of a hydrated zinc stannate sol. This sol had a pH of 10.42 and an electrical conductivity of 377 µs/cm. Particles of the hydrated zinc stannate in this sol had a primary particle diameter of 5 nm as observed by a transmission electron microscope. The transmission electron microscopic photograph is shown in FIG. 1. Further, the $ZnO/SnO_2$ molar ratio was 0.85. From the results of the thermogravimetric analysis (TG) in FIG. 3, the weight reduction at a temperature of 322° C. was 15.18%, and in the formula $xZnO.ySnO_2.zH_2O$, x:y:z was 1:1.18:3.40. This sol was passed through a column packed with an anion exchange resin (Amberlite IRA-410, used in a hydroxyl group form) to further remove anions. This sol had a pH of 11.05 and an electrical conductivity of 289 µs/cm. Further, 100 ml of a cation exchange resin (Amberlite IR-120B, used in a hydrogen form) was added thereto, followed by stirring to remove cations. The cation exchange resin was separated therefrom to obtain 4,077 g of a sol. The obtained sol had a pH of 7.98 and an electrical conductivity of 98.6 µs/cm.

Step (d)

Figure 2:
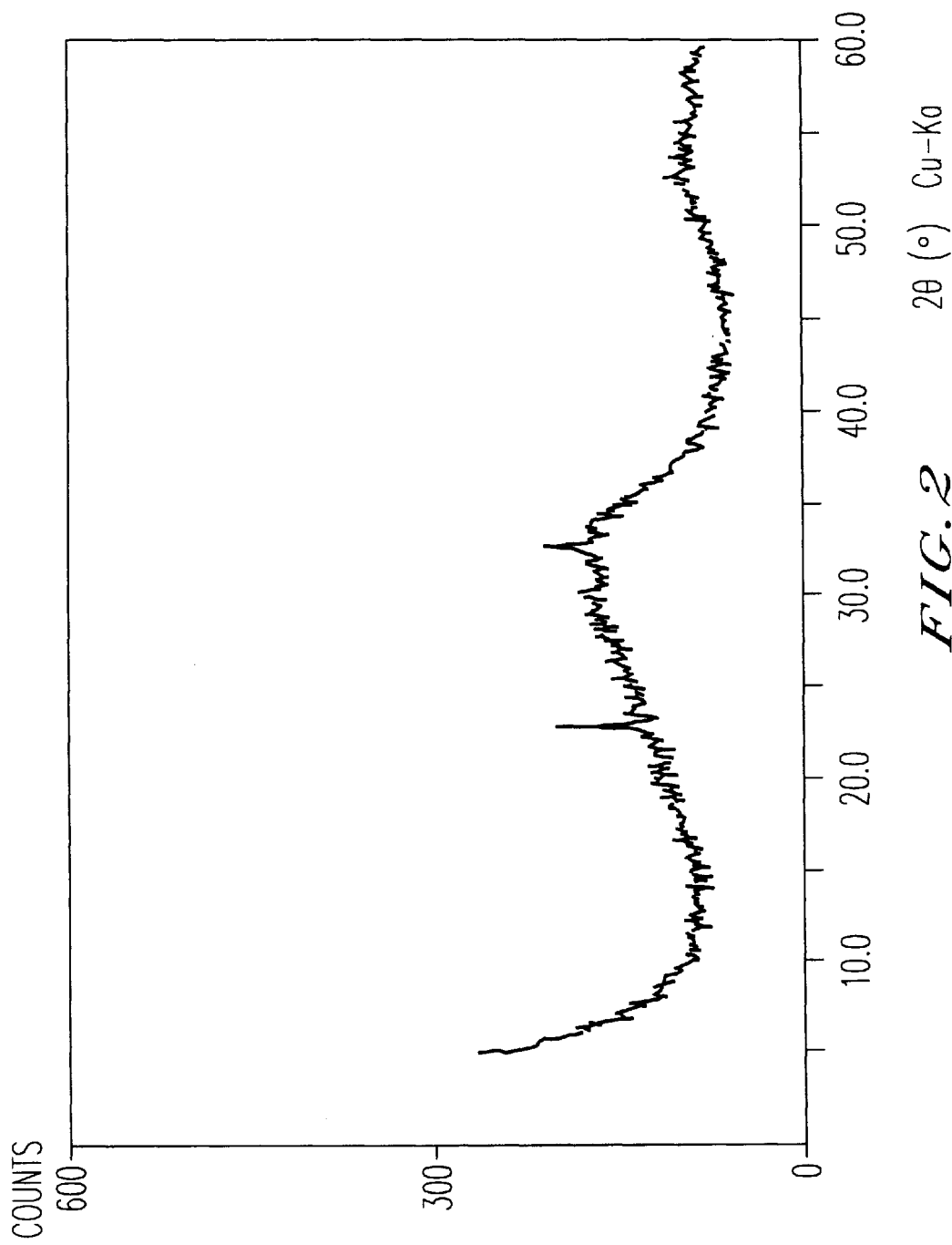
FIG. 2 is an X-ray diffraction pattern of the powder obtained by drying the hydrated zinc stannate sol prepared in Preparation Example 2, at a temperature of 110° C.

The sol obtained in step (c) was concentrated by an ultrafiltration apparatus at a liquid temperature of 30° C. to obtain 930 g of a concentrated sol. The obtained sol had a pH of 7.83, an electrical conductivity of 213 µs/cm and a concentration of 11.8 wt % as calculated as $ZnO+SnO_2$, and the yield was 91.5%. This product was dried at 110° C., and from the X-ray diffraction analysis, the dried product was substantially amorphous hydrated zinc stannate. The results of the X-ray diffraction analysis are shown in FIG. 2.

Step (e)

1.52 g of tartaric acid and 2.28 g of diisobutylamine were added to 312 g of the sol obtained in step (d) with stirring, to obtain an adjusted sol. Then, the adjusted sol was introduced into a rotary evaporator, and while gradually adding 13 l of methanol, water in the sol was distilled off under reduced pressure, to obtain 232 g of a hydrated zinc stannate methanol sol. The obtained sol had a specific gravity of 0.930, a viscosity of 28.1 mPa.s, a pH (1+1) of 8.18, an electrical conductivity (1+1) of 200 µs/cm, a concentration of 18.8 wt % as calculated as $ZnO+SnO_2$ and a water content of 0.77 wt %. Particles of the hydrated zinc stannate in this sol had a primary particle size of 5 nm as observed by a transmission electron microscope and a $ZnO/SnO_2$ molar ratio of 0.85. Further, in the formula $xZnO.ySnO_2.zH_2O$, x:y:z was 1:1.18:3.40.

PREPARATION EXAMPLE 3

200.4 g of potassium stannate ($K_2SnO_3.3H_2O$, manufactured by Showa Kako K. K., containing 50.4 wt % as $SnO_2$) was dissolved in 4,849.6 g of water to obtain an aqueous potassium stannate solution (containing 2.0 wt % as SnO$_2$). Then, 104.9 g of an aqueous gluconic acid solution (manufactured by Fujisawa Pharmaceutical Co., Ltd., content: 50 wt %) was added thereto to obtain 5,154.9 g of an aqueous solution of potassium stannate/gluconic acid mixture. Separately, 91.4 g of zinc chloride (ZnCl$_2$) was dissolved in 3,403.9 g of water to obtain an aqueous zinc chloride solution, and 989.2 g of a 35 wt % hydrogen peroxide aqueous solution was added thereto to obtain 4,484.5 g of an aqueous solution of zinc chloride/hydrogen peroxide mixture.

Step (a)

By means of a quantitative pump, the aqueous solution of zinc chloride/hydrogen peroxide mixture prepared as described above, was added and reacted to the aqueous solution of potassium stannate/gluconic acid mixture over a period of about one hour with stirring by a disper, to obtain 9,639.4 g of a hydrated zinc stannate colloidal solution. This hydrated zinc stannate colloidal solution had a pH of 7.0, a gluconic acid/SnO$_2$ molar ratio of 0.40, a H$_2$O$_2$ content of 3.59 wt %, a ZnO/SnO$_2$ molar ratio of 1.00 and a concentration of 1.62 wt % as calculated as ZnO+SnO$_2$.

Step (b)

The hydrated zinc stannate colloidal solution obtained in step (a) was heated at 90° C. for 5 hours for aging. After cooling, 25.0 g of isopropylamine was added thereto, and the mixture was stirred for 11 hours by a disper to obtain 9,664.4 g of a hydrated zinc stannate colloidal solution. This colloidal solution had a pH of 9.45, an electrical conductivity of 19.0 ms/cm and a concentration of 1.61 wt % as calculated as ZnO+SnO$_2$.

Step (c)

An excess electrolyte in the hydrated zinc stannate colloidal solution obtained in step (b) was removed by washing with water by an ultrafiltration method using 32 l of water, to obtain 2,990 g of a hydrated zinc stannate sol. Particles of the hydrated zinc stannate in this sol had a primary particle diameter of 5 nm as observed by a transmission electron microscope, and the ZnO/SnO$_2$ molar ratio was 1.02. Further, in the formula xZnO.ySnO$_2$.zH$_2$O, x:y:z was 1:0.98:3.80. This sol was passed through a column packed with an anion exchange resin (Amberlite IRA-410, used in a hydroxyl group form) to further remove anions. This sol had a pH of 10.23 and an electrical conductivity of 474 µs/cm. Then, 70 ml of a cation exchange resin (Amberlite IR-120B, used in a hydrogen form) was added thereto, followed by stirring to remove cations. The cation exchange resin was separated therefrom to obtain 3,151 g of a sol. The obtained sol had a pH of 7.87 and an electrical conductivity of 173 µs/cm.

Step (d)

5.6 g of citric acid and 8.5 g of diisopropylamine were added to the sol obtained in step (c), followed by concentration under reduced pressure by means of a rotary evaporator, to obtain 1,096 g of a concentrated sol. The obtained sol had a concentration of 13.2 wt % as calculated as ZnO+SnO$_2$. This sol was dried at 110° C., and the refractive index of the dried product was 1.70, and in the X-ray diffraction analysis, a small peak of a crystalline hydrated zinc stannate was observed, but the majority was an amorphous hydrated zinc stannate.

Step (e)

The sol obtained in step (d) was introduced into a rotary evaporator, and while gradually adding 63 l of methanol, water in the sol was distilled under reduced pressure to obtain 641.6 g of a hydrated zinc stannate methanol sol. The obtained sol had. a specific gravity of 0.960, a viscosity of 21.0 mPa.s, a pH (1+1) of 8.60, an electrical conductivity (1+1) of 446.5 µs/cm, a concentration of 22.6 wt % as calculated as ZnO+SnO$_2$, and a water content of 0.80 wt %. Particles of the hydrated zinc stannate in this sol had a primary particle diameter of 5 nm as observed by a transmission electron microscope, and a ZnO/SnO$_2$ molar ratio of 1.02. Further, in the formula xZnO.ySnO$_2$.zH$_2$O, x:y:z was 1:0.98:3.80.

PREPARATION EXAMPLE 4

183.6 g of sodium stannate (Na$_2$SnO$_3$.3H$_2$O, manufactured by Showa Kako K. K., containing 55 wt % as SnO$_2$) was dissolved in 4,960.9 of water to obtain an aqueous sodium stannate solution (containing 3.3 wt % as SnO$_2$), and 10.0 g of tartaric acid was added thereto to obtain 5,154.5 g of an aqueous solution of sodium stannate/tartaric acid mixture. Separately, 91.2 g of zinc chloride (ZnCl$_2$) was dissolved in 3,311.7 g of water to obtain an aqueous zinc chloride solution, and 989.2 g of a 35 wt % hydrogen peroxide aqueous solution was added thereto to obtain 4,392.1 g of an aqueous solution of zinc chloride/hydrogen peroxide mixture.

Step (a)

By means of a quantitative pump, the aqueous solution of zinc chloride/hydrogen peroxide mixture prepared as described above, was added and reacted to the aqueous solution of sodium stannate,/tartaric acid mixture over a period of about one hour with stirring by a disper, to obtain 9,546.6 g of a hydrated zinc stannate colloidal solution. This hydrated zinc stannate colloidal solution had a pH of 8.0, a tartaric acid/SnO$_2$ molar ratio of 0.10, a H$_2$O$_2$ content of 3.59 wt %, a ZnO/SnO$_2$ molar ratio of 1.0 and a concentration of 1.63 wt % as calculated as ZnO+SnO$_2$.

Step (b)

The hydrated zinc stannate colloidal solution obtained in step (a) was heated at 90° C. for 4 hours for aging. After cooling, 20.0 g of isopropylamine was added thereto, and the mixture was stirred for 10 hours by a disper to obtain 9,566.6 g of a hydrated zinc stannate colloidal solution. This colloidal solution had a pH of 9.86, an electrical conductivity of 14.6 ms/cm and a concentration of 1.62 wt % as calculated as ZnO+SnO$_2$.

Step (c)

An excess electrolyte in the hydrated zinc stannate colloidal solution obtained in step (b) was removed by washing with water by an ultrafiltration method using 30 l of water, to obtain 2,873 g of a hydrated zinc stannate sol. This sol had a pH of 10.28 and an electrical conductivity of 368 µs/cm. Particles of the hydrated zinc stannate in this sol had a primary particle diameter of 5 nm as observed by a transmission electron microscope, and the ZnO/SnO$_2$ molar ratio was 0.98. Further, in the formula xZnO.ySnO$_2$.zH$_2$O, x:y:z was 1:1.02:3.40. This sol was passed through a column packed with an anion exchange resin (Amberlite IRA-410, used in a hydroxyl group form) to further remove anions. This sol had a pH of 10.86 and an electrical conductivity of 260 µs/cm. Further, 70 ml of a cation exchange resin (Amberlite IR-120B, used in a hydrogen form) was added thereto, followed by stirring to remove cations. The cation exchange resin was separated therefrom to obtain 4,058 g of a sol. The obtained sol had a pH of 7.43 and an electrical conductivity of 23.2 µs/cm.

Step (d)

6.0 g of tartaric acid and 9.0 g of diisobutylamine were added to the sol obtained in step (c) with stirring, followed by concentration under reduced pressure by means of a rotary evaporator, to obtain 1,214 g of a concentrated sol.

The obtained sol had a specific gravity of 1.170, a viscosity of 28.1 mPa.s, a pH of 7.84, an electrical conductivity of 3,200 μs/cm and a concentration of 11.8 wt % as calculated as $ZnO+SnO_2$. This sol was dried at 110° C., and the refractive index of the dried product was 1.72, and in the X-ray diffraction analysis, the product was found to be amorphous hydrated zinc stannate. Particles of the hydrated zinc stannate in this sol had a primary particle diameter of from 7 to 15 nm as observed by a transmission electron microscope, and the $ZnO/SnO_2$ molar ratio was 0.98. Further, in the formula $xZnO \cdot ySnO_2 \cdot zH_2O$, x:y:z was 1:1.02:3.40.

PREPARATION EXAMPLE 5

1,422.8 g of sodium hydroxide was dissolved in 2,188.4 g of water, and 368.8 g of zinc oxide was added and dissolved therein to obtain 4,004.2 g of an aqueous sodium zincate solution. This solution contained 9.21 wt % of ZnO and 25.61 wt % of $Na_2O$, wherein the $Na_2O/ZnO$ molar ratio was 3.65. Then, 500.6 g of the above aqueous sodium zincate solution and 163.3 g of sodium stannate ($Na_2SnO_3 \cdot 3H_2O$, manufactured by Showa Kako K. K., containing 55 wt % as $SnO_2$) were dissolved in 3,842.5 g of water to obtain an aqueous solution of sodium zincate/sodium stannate mixture (containing 1.02 wt % as ZnO, containing 1.99 wt % as $SnO_2$, $ZnO/SnO_2$ molar ratio: 0.95), and 93.6 g of an aqueous gluconic acid solution (manufactured by Fujisawa Pharmaceutical Co., Ltd., content: 50 wt %) was added thereto to obtain 4,600 g of an aqueous solution of sodium zincate/sodium stannate/gluconic acid mixture. Separately, 555.8 g of 35 wt % hydrochloric acid was dissolved in 3,203.2 g of water, and 441.0 g of a 35 wt % hydrogen peroxide aqueous solution was added thereto to obtain 4,200 g of an aqueous solution of hydrochloric acid/hydrogen peroxide mixture.

Step (a')

By means of a quantitative pump, the aqueous solution of hydrochloric acid/hydrogen peroxide mixture prepared as described above was added and reacted to the aqueous solution of sodium zincate/sodium stannate/gluconic acid mixture over a period of about one hour with stirring by a disper, to obtain a slurry of agglomerates of hydrated zinc stannate colloidal particles. This slurry had a gluconic acid/$SnO_2$ molar ratio of 0.40, a pH of 6.7, a $H_2O_2$ content of 1.75 wt % and a $ZnO/SnO_2$ molar ratio of 0.95.

Step (b')

252 g of 5 wt % hydrochloric acid was added to the slurry of agglomerates of hydrated zinc stannate colloidal particles, obtained in step (a') to adjust the pH to 5.00 and then heated at 90° C. for 4 hours for aging. The obtained slurry had a pH of 5.80, an electrical conductivity of 54 ms/cm and a concentration of 1.55 wt % as calculated as $ZnO+SnO_2$.

Step (c')

An excess electrolyte in the slurry of the hydrated zinc stannate colloidal particles, obtained in step (b') was removed by washing with water by an ultrafiltration method using 24 l of water, to obtain 1,000 g of a slurry of hydrated zinc stannate agglomerates. Then, 3.0 g of isopropylamine was added to this slurry to adjust the pH to 8.60. The electrical conductivity of this slurry was 620 μs/cm.

Step (d')

1,200 g of glass beads (1.0 to 1.2 mm in diameter) were added to the slurry c,f agglomerates of hydrated zinc stannate colloidal particles, obtained in step (c'), followed by dispersing in a wet system for peptization for 71 hours by a ball mill. Then, the glass beads were separated therefrom to obtain a sol. The obtained sol was passed through a column packed with an anion exchange resin (IRA-410) to obtain 3,052.7 g of a hydrated zinc stannate sol. ParticLes of the hydrated zinc stannate in this sol had a primary particle diameter of 7 nm as observed by a transmission electron microscope, and the $ZnO/SnO_2$ molar ratio was 0.80. Further, in the formula $xZnO \cdot ySnO_2 \cdot zH_2O$, x:y:z was 1:1.25:3.40.

Step (e')

The sol obtained in step (d') was concentrated by means of an ultrafiltration apparatus to obtain 1,269 g of a concentrated sol. The obtained sol had a pH of 9.80, an electrical conductivity of 730 μs/cm and a concentration of 9.06 wt % as calculated as $ZnO+SnO_2$.

Step (f')

1.72 g of diisobutylamine and 1.15 g of citric acid were added to 633 g of the sol obtained in step (e') with stirring, to obtain an adjusted sol. Then, this sol was introduced into a rotary evaporator, and while gradually adding 13 l of methanol, water in the sol was distilled under reduced pressure to obtain 322 g of a hydrated zinc stannate methanol sol. The obtained sol had a specific gravity of 0.910, a viscosity of 21.6 mPa.s, a pH (1+1) of 8.25, an electrical conductivity (1+1) of 253.5 μs/cm, a concentration of 15.3 wt % as calculated as $ZnO+SnO_2$ and a water content of 0.56 wt %. Particles of the hydrated zinc stannate in this sol had a primary particle diameter of from 7 to 15 nm as observed by a transmission electron microscope, and the $ZnO/SnO_2$ molar ratio was 0.80. Further, in the formula $xZnO \cdot ySnO_2 \cdot zH_2O$, x:y:z was 1:1.25:3.40. This sol was dried at 110° C., and the refractive index of the dried product was 1.72, and in the X-ray diffraction analysis, the pattern agreed to the peak pattern of $ZnSnO_3 \cdot 3H_2O$ according to ASTM No. 20-1455.

PREPARATION EXAMPLE 6

500.6 g of the aqueous sodium zincate solution prepared in Preparation Example 5 and 163.3 g of sodium stannate ($Na_2SnO_3 \cdot 3H_2O$, manufactured by Showa Kako K. K., containing 55 wt % as $SnO_2$) were dissolved in 3,898.5 g of water to obtain an aqueous solution of sodium zincate/sodium stannate mixture (containing 1.01 wt % as ZnO, containing 1.97 wt % as $SnO_2$, $ZnO/SnO_2$ molar ratio: 0.95), and 37.6 g of citric acid was added thereto to obtain 4,600 g of an aqueous solution of sodium zincate/sodium stannate/citric acid mixture. Separately, 524.9 g of 35 wt % hydrochloric acid was dissolved in 3,234.1 g of water, and 441.0 g of a 35 wt % hydrogen peroxide aqueous solution was added thereto to obtain 4,200 g of an aqueous solution of hydrochloric acid/hydrogen peroxide mixture.

Step (a')

By means of a quantitative pump, the aqueous solution of hydrochloric acid/hydrogen peroxide mixture prepared as described above, was added and reacted to the aqueous solution of sodium zincate/sodium stannate/citric acid mixture over a period of about one hour with stirring by a disper, to obtain a slurry of agglomerates of hydrated zinc stannate colloidal particles. The slurry had a citric acid/$SnO_2$ molar ratio of 0.40, a $H_2O_2$ content of 1.75 wt % and a $ZnO/SnO_2$ molar ratio of 0.95.

Step (b')

The slurry of agglomerates of hydrated zinc stannate colloidal particles, obtained in step (a') was heated at 90° C. for 5 hours for aging. This slurry had a pH of 8.00, an electrical conductivity of 54 ms/cm and a concentration of 1.55 wt % as calculated as $ZnO+SnO_2$.

Step (c')

An excess electrolyte in the slurry of agglomerates of hydrated zinc stannate colloidal particles, obtained in step (b'), was removed by washing with water by an ultrafiltration method using 36 l of water, to obtain 1,498 g of a slurry of hydrated zinc stannate agglomerates. This slurry had a pH of 8.60 and an electrical conductivity of 686 μs/cm.

Step (d')

1,500 g of glass beads (1.0 to 1.2 mm in diameter) were added to the slurry obtained in step (c'), followed by dispersing in a wet system for peptization for 72 hours by a ball mill. The glass beads were separated therefrom to obtain a sol. The obtained sol was passed through a column packed with an anion exchange resin (IRA-410) to obtain 2,576 g of a hydrated zinc stannate sol. Particles of the hydrated zinc stannate in this sol had a primary particle diameter of from 10 to 30 nm as observed by a transmission electron microscope, and the $ZnO/SnO_2$ molar ratio was 0.90. Further, in the formula $xZnO.ySnO_2.zH_2O$, x:y:z was 1:1.11:3.20.

Step (e')

The sol obtained in step (d') was concentrated under reduced pressure by means of a rotary evaporator to obtain 1,345.4 g of a concentrated sol. The obtained sol had a pH of 8.58, an electrical conductivity of 530 μs/cm and a concentration of 10.1 wt % as calculated as $ZnO+SnO_2$.

Step (f')

2.04 g of diisobutylamine and 1.36 g of citric acid were added to 672 g of the sol obtained in step (e') with stirring to obtain an adjusted sol. This sol was introduced into a rotary evaporator, and while gradually adding 13 l of methanol, water in the sol was distilled under reduced pressure to obtain 322 g of a hydrated zinc stannate methanol sol. The obtained sol had a specific gravity of 0.960, a viscosity of 2.8 mPa.s, a pH (1+1) of 8.15, an electrical conductivity (1+1) of 139.5 μs/cm, a concentration of 21.0 wt % as calculated as $ZnO+SnO_2$ and a water content of 0.53 wt %. Particles of the hydrated zinc stannate in this sol had a primary particle diameter of from 10 to 70 nm as observed by a transmission electron microscope, and the $ZnO/SnO_2$ molar ratio was 0.90. Further, in the formula $xZnO.ySnO_2.zH_2O$, x:y:z was 1:1.11:3.20. This sol was dried at 110° C., and the refractive index of the dried product was 1.74, and in the X-ray diffraction analysis, the pattern agreed to the peak pattern of $ZnSnO_3.3H_2O$ according to ASTM No. 20-1455.

PREPARATION EXAMPLE 7

1,001.2 g of the aqueous sodium zincate solution prepared in Preparation Example 5 and 326.8 g of sodium stannate ($Na_2SnO_3.3H_2O$, manufactures by Showa Kako K. K., containing 55 wt % as $SnO_2$) were dissolved in 7,872 g of water to obtain 9,200 g of an aqueous solution of sodium zincate/sodium stannate mixture (containing 1.00 wt % as ZnO, containing 1.95 wt % as $SnO_2$, $ZnO/SnO_2$ molar ratio: 0.95). Separately, 1,116.6 g of 3.5 wt % hydrochloric acid was dissolved in 5,519.4 g of water, and 1,764.0 g of a 35 wt % hydrogen peroxide aqueous solution was added thereto to obtain 8,400 g of an aqueous solution of hydrochloric acid/hydrogen peroxide mixture.

Step (a')

By means of a quantitative pump, the aqueous solution of hydrochloric acid/hydrogen peroxide mixture prepared as described above, was added and reacted to the aqueous solution of sodium zincate/sodium stannate mixture over a period of about one hour with stirring by a disper, to obtain a slurry of agglomerates of hydrated zinc stannate colloidal particles. The slurry of agglomerates of hydrated zinc stannate colloidal particles had a pH of 8.7, a $H_2O_2$ content of 3.51 wt % and a $ZnO/SnO_2$ molar ratio of 0.95.

Step (b')

140 g of 5 wt % hydrochloric acid was added to the slurry of agglomerates of hydrated zinc stannate colloidal particles, obtained in step (a') to adjust the pH to 7.13 and then heated at 90° C. for 4 hours for aging. The obtained slurry had a pH of 10.55, an electrical conductivity of 53 ms/cm and a concentration of 1.55 wt % as calculated as $ZnO+SnO_2$.

Step (c')

50 g of 5 wt % hydrochloric acid was added to the slurry of hydrated zinc stannate colloidal particles, obtained in step (b') to adjust the pH to 6.80. Then, an excess electrolyte was removed by washing with water by decantation and ultrafiltration using 40 l of water. The obtained slurry of hydrated zinc stannate agglomerates was 1,788 g and had a pH of 8.93 and an electrical conductivity of 162 μs/cm.

Step (d')

Figure 4:
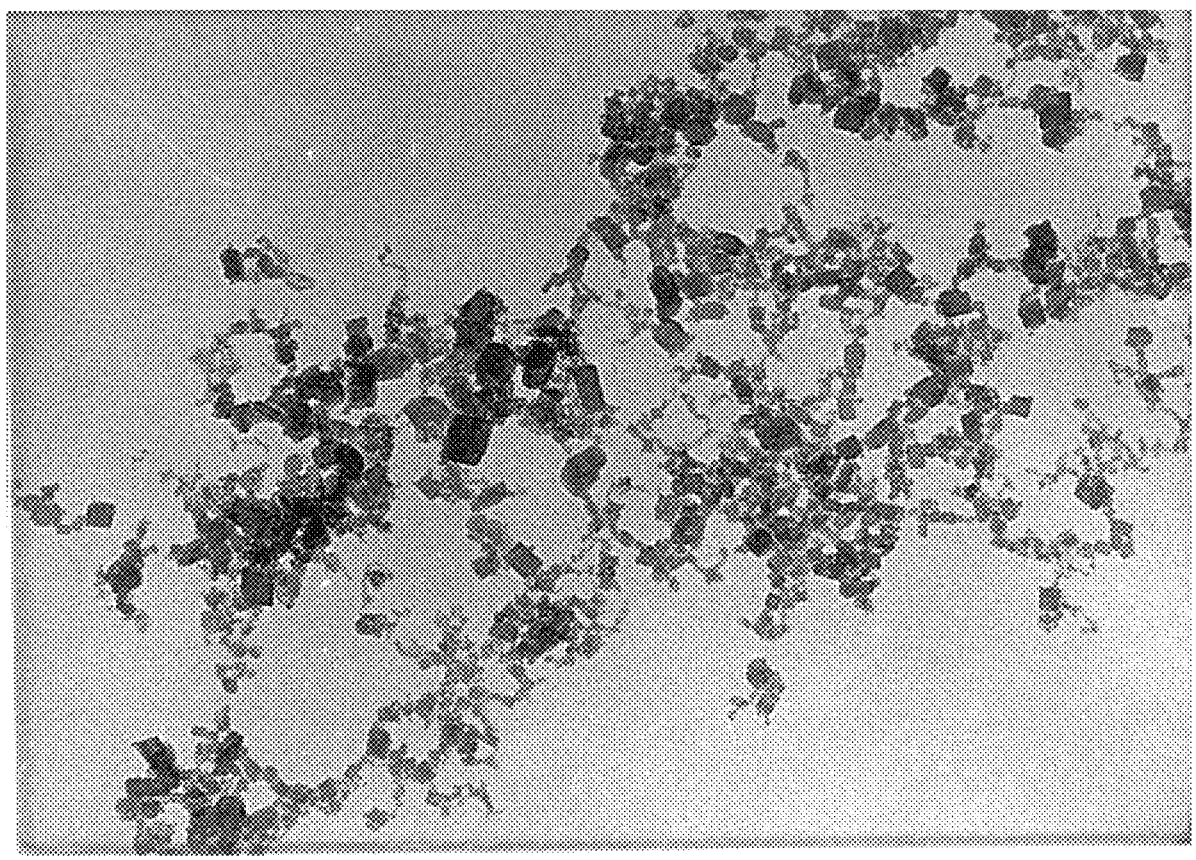
FIG. 4 is a transmission electron microscopic photograph showing the structure of particles of the hydrated zinc stannate sol prepared in Preparation Example 7, with 200,000 magnifications.
Figure 6:
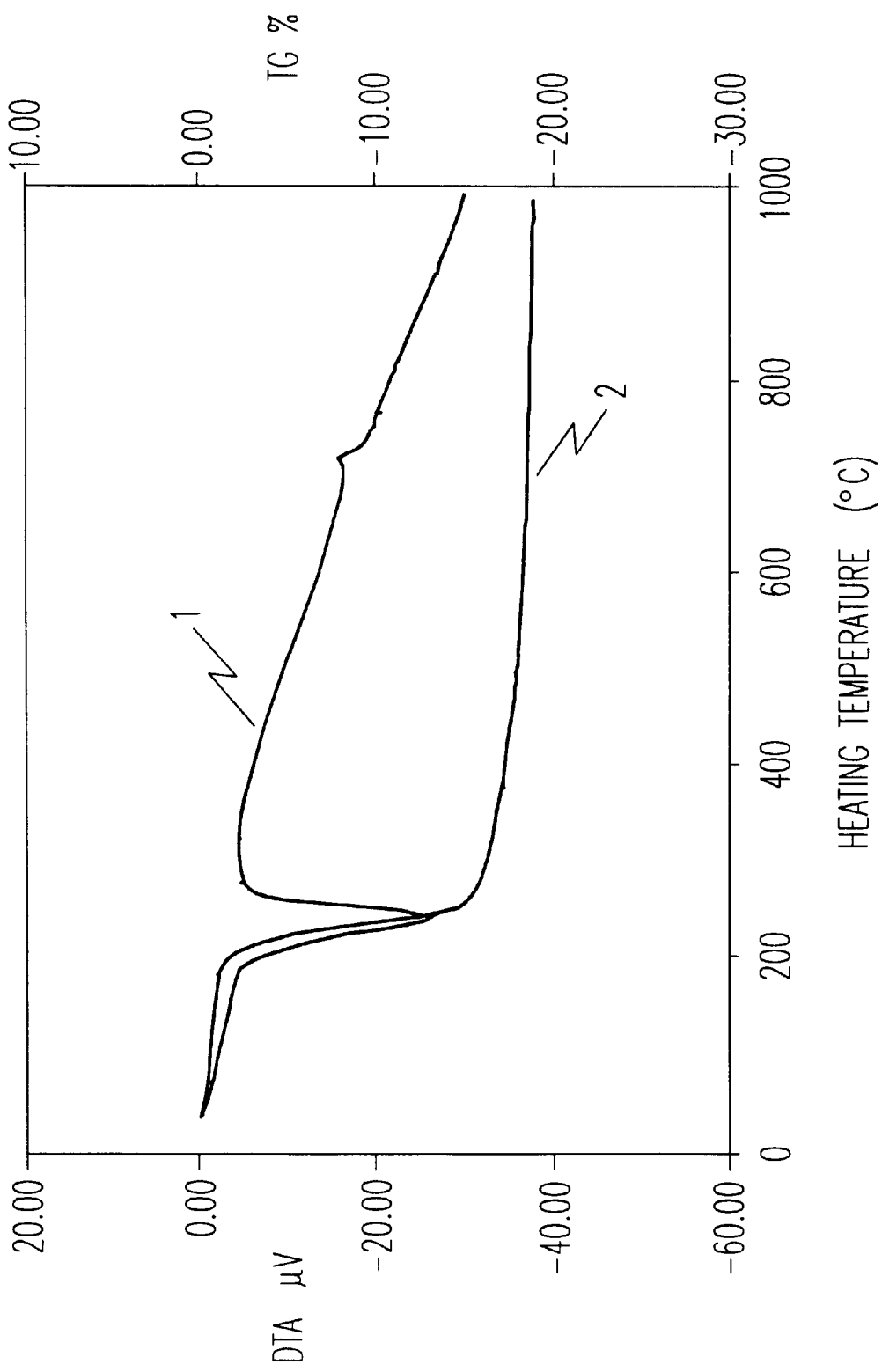
FIG. 6 is a differential thermal analysis of the powder obtained by drying the hydrated zinc stannate sol prepared in Preparation Example 7, at a temperature of 110° C.

750 g of water and 14.6 g of a 15 wt % potassium hydroxide aqueous solution. were added to 1,434 g of the slurry obtained in step (c') to adjust the pH to 11.6. Then, the slurry was peptized by dispersing in a wet system for 24 hours in a sand grinder filled with glass beads (1.0 to 1.2 mm in diameter) to obtain 2,860 g of a hydrated zinc stannate sol. The obtained sol had a pH of 11.25 and an electrical conductivity of 1,210 μs/cm. Then, 5.4 g of citric acid and 40 ml of a cation exchange resin (IR-120B) were added to the obtained sol with stirring, and the mixture was stirred for one hour. Then, the resin was separated therefrom. The obtained sol had a pH of 6.86 and an electrical conductivity of 188 μs/cm. Particles of the hydrated zinc stannate in this sol had a primary particle diameter of from 5 to 30 nm as observed by a transmission electron microscope. The transmission electron microscopic photograph is shown in FIG. 4. Further, the $ZnO/SnO_2$ molar ratio was 0.95. Further, from the results of the thermogravimetric analysis (TG) in FIG. 6, the weight reduction at a temperature of 262° C. was 15.39%, and in the formula $xZnO.ySnO_2.zH_2O$, x:y:z was 1:1.05:3.10.

Step (e')

8.1 g of diisobutylamine was added to the sol obtained in step (d') to adjust the pH to 9.90. Then, the sol was concentrated under reduced pressure by means of a rotary evaporator to obtain 1,381 g of a concentrated sol. The obtained sol had a specific gravity of 1.194, a viscosity of 264 mPa.s, a pH of 8.52, an electrical conductivity of 2,040 μs/cm and a concentration of 19.1 wt % as calculated as $ZnO+SnO_2$.

Step (f')

Figure 5:
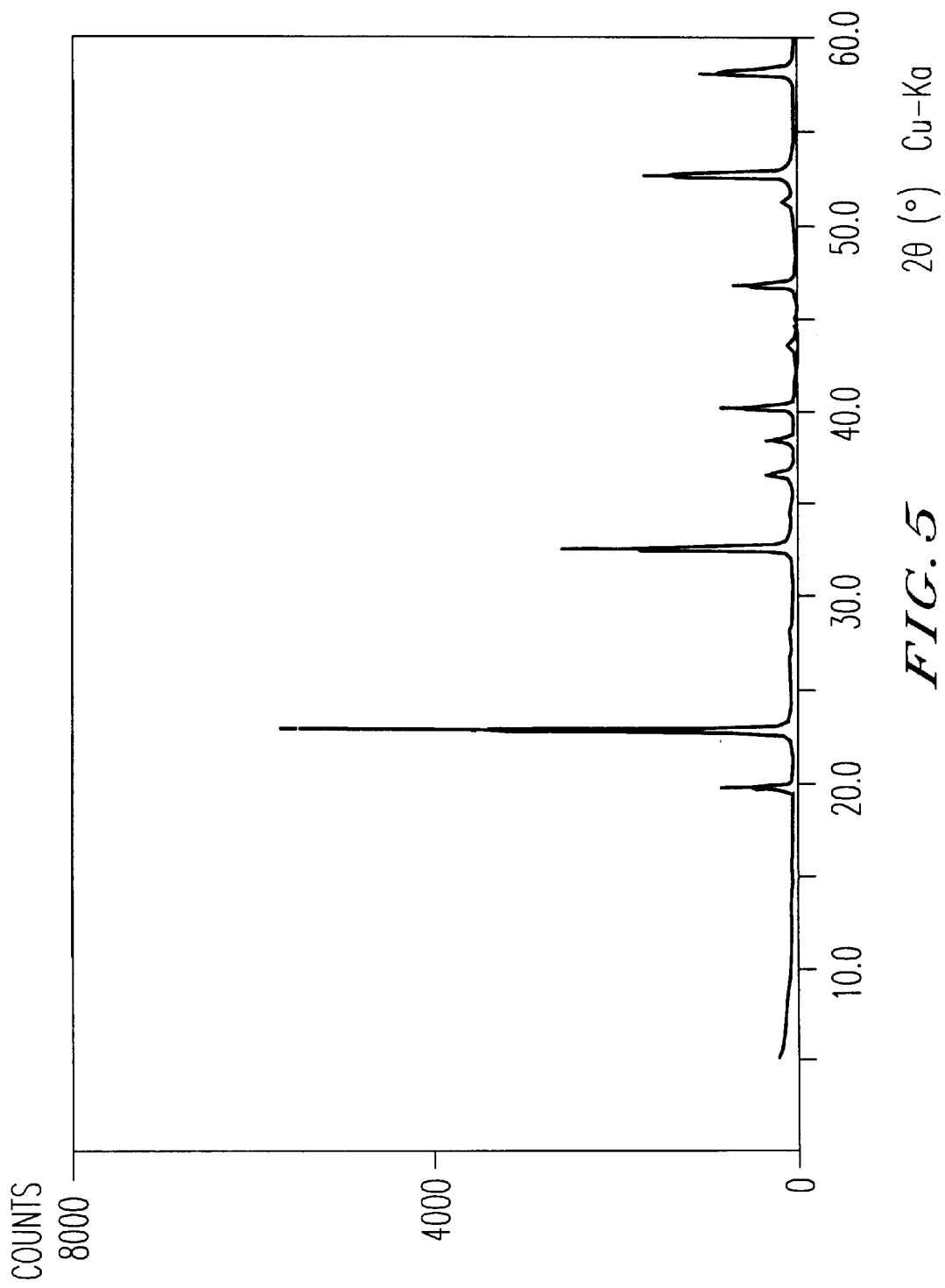
FIG. 5 is a X-ray diffraction pattern of the powder obtained by drying the hydrated zinc stannate sol prepared in Preparation Example 7, at a temperature of 110° C.

1,251 g of the sol obtained in step (e') was introduced into a rotary evaporator, and while gradually adding 31 l of methanol, water in the sol was distilled under reduced pressure to obtain 1,036.3 g of a hydrated zinc stannate methanol sol. The obtained sol had a specific gravity of 0.970, a viscosity of 17.5 mPa.s, a pH (1+1) of 7.85, an electrical conductivity (1+1) of 96.0 μs/cm, a concentration of 23.6 wt % as calculated as $ZnO+SnO_2$ and a water content of 0.53 wt %. Particles of the hydrated zinc stannate in this sol had a primary particle diameter of from 5 to 30 nm as observed by a transmission electron microscope, and the $ZnO/SnO_2$ molar ratio was 0.95. Further, in the formula $xZnO.ySnO_2.zH_2O$, x:y:z was 1:1.05:3.10. This sol was dried at 110° C., and the refractive index of the dried product was 1.78, and in the X-ray diffraction analysis, the pattern agreed to the peak pattern of $ZnSnO_3.3H_2O$ according to ASTM No. 20-1455. The results of the X-ray diffraction analysis are shown in FIG. 5.

PREPARATION EXAMPLE 8

1,001.2 g of the aqueous sodium zincate solution prepared in Preparation Example 5 and 326.8 g of sodium stannate ($Na_2SnO_3.3H_2O$, manufactured by Showa Kako K. K., containing 55 wt % as $SnO_2$) were dissolved in 2,734.2 g of water to obtain 4,062.2 g of an aqueous solution of sodium zincate/sodium stannate mixture (containing 2.31 wt % as ZnO, containing 4.49 wt % as $SnO_2$, $ZnO/SnO_2$ molar ratio: 0.95). Separately, 1,116.6 g of 35 wt % hydrochloric acid was dissolved in 2,001.4 g of water, and 882.0 g of a 35 wt % hydrogen peroxide aqueous solution was added thereto to obtain 4,000 g of an aqueous solution of hydrochloric ac..d/hydrogen peroxide mixture.

Step (a')

By means of quantitative pumps, respectively, the aqueous solution of hydrogen chloride/hydrogen peroxide mixture and the aqueous solution of sodium zincate/sodium stannate mixture, prepared as described above, were simultaneously added and reacted in 1,000 g of water over a period of about 1 hour, to obtain a slurry of agglomerates of hydrated zinc stannate colloidal particles. The slurry had a pH of 9.0, a $H_2O_2$ content of 3.43 wt % and a $ZnO/SnO_2$ molar ratio of 0.95.

Step (b')

198.7 g of 5 wt % hydrochloric acid was added to the slurry of agglomerates of hydrated zinc stannate colloidal particles, obtained in step (a') to adjust the pH to 6.65 and then heated at 90° C. for 4 hours for aging. The obtained slurry had a pH of 8.50, an electrical conductivity of 73 ms/cm and a concentration of 3.02 wt % as calculated as $ZnO+SnO_2$.

Step (c')

An excess electrolyte in the slurry of hydrated zinc stannate colloidal particles, obtained in step (b'), was removed by washing with water by an ultrafiltration method using 40 l of water, to obtain 2,355 g of a slurry of hydrated zinc stannate agglomerates. This slurry had a pH of 8.85 and an electrical conductivity of 170 μs/cm.

Step (d')

9.0 g of a 15 wt % potassium hydroxide aqueous solution was added to the slurry obtained in step (c') to adjust the pH to 10.9 and then peptized by dispersing in a wet system for 24 hours in a sand grinder filled with glass beads (1.0 to 1.2 mm in diameter), to obtain 5,525 g of a hydrated zinc stannate sol. The obtained sol had a pH of 10.95 and an electrical conductivity of 471 μs/cm. The obtained sol was further passed through a column packed with an anion exchange resin (IRA-410) to obtain 5,883 g of a hydrated zinc stannate sol. Then, 5.4 g of citric acid and 60 ml of a cation exchange resin (IR-120B) were added to the obtained sol with stirring, and the mixture was stirred for one hour. Then, the resin was separated therefrom. The obtained sol had a pH of 4.47 and an electrical conductivity of 54.3 μs/cm. Particles of the hydrated zinc stannate in this sol had a primary particle diameter of from 7 to 15 nm as observed by a transmission electron microscope, and the $ZnO/SnO_2$ molar ratio was 0.95. Further, in the formula $xZnO.ySnO_2.zH_2O$, x:y:z was 1:1.05:2.80.

Step (e')

8.1 g of diisobutylamine was added to the sol obtained in step (d') to adjust the pH to 8.90, and then the sol was concentrated by means of an ultrafiltration apparatus to obtain 1,582 g of a concentrated sol. The obtained sol had a specific gravity of 1.188, a viscosity of 2.8 mPa.s, a pH of 7.37, an electrical conductivity of 1,780 μs/cm and a concentration of 17.1 wt % as calculated as $ZnO+SnO_2$.

Step (f')

2.57 g of diisopropylamine and 1.25 g of citric acid were added to 1,455 g of the sol obtained in step (e') with stirring to obtain an adjusted sol. Then, the sol was introduced into a rotary evaporator, and while gradually adding 24 l of methanol, water in the sol was distilled under reduced pressure to obtain 806.6 g of a hydrated zinc stannate methanol sol. The obtained sol had a specific gravity of 1.140, a viscosity of 2.0 mPa.s, a pH (1+1) of 6.93, an electrical conductivity (1+1) of 302 μs/cm, a concentration of 30.8 wt % as calculated as $ZnO+SnO_2$ and a water content of 0.71 wt %. Particles of the hydrated zinc stannate in the sol had a primary particle diameter of from 7 to 15 nm as observed by a transmission electron microscope, and the $ZnO/SnO_2$ molar ratio was 0.95. Further, in the formula $xZnO.ySnO_2.zH_2O$, x:y:z was 1:1.05:2.80. This sol was dried at 110° C., and the refractive index of this dried product was 1.78, and in the X-ray diffraction analysis, the pattern agreed to the peak pattern of $ZnSnO_3.3H_2O$ according to ASTM No. 20-1455.

PREPARATION EXAMPLE 9

An aqueous sol of stannic oxide to be used for the preparation of a modified metal oxide sol of the present invention, was prepared.

By a reaction of metal tin powder, an aqueous hydrochloric acid solution and an aqueous hydrogen peroxide solution, an aqueous sol of stannic oxide was obtained. The obtained sol had a specific gravity of 1.420, a pH of 0.40, a viscosity of 32 mPa.s immediately after stirring, a $SnO_2$ content of 3:3.0 wt %, a HCl content of 2.56 wt %, a fusiform colloidal particle diameter of at most 10 nm as observed by an electron microscope, a specific surface area of particles of 120 $m^2/g$ as measured by a BET method, a particle diameter of 7.2 nm as calculated from this specific surface area and a particle diameter of 107 nm as measured by a dynamic light scattering method by a $N_4$ device manufactured by Coulter Inc. U.S.A. 2,000 g of this slightly yellow transparent aqueous sol of stannic oxide was dispersed in 18,000 g of water to obtain a dilute sol.

Then, 8.0 g of isopropylamine was added to the entire amount of this dilute sol. Then, obtained liquid was passed through a column packed with a hydroxyl group form anion exchange resin to obtain 20,625 g of an alkaline aqueous sol of stannic oxide.

This alkaline aqueous sol of stannic oxide was stable and had a colloidal color, but the transparency was very high, and it had a specific gravity of 1.032, a pH of 9.80, a viscosity of 1.3 mPa.s, a $SnO_2$ content of 3.20 wt % and an isopropylamine content of 0.039 wt %.

PREPARATION EXAMPLE 10

An aqueous sol of zirconium oxide to be used for the preparation of a modified metal oxide sol of the present invention, was prepared.

An aqueous zirconium oxychloride solution was hydrolyzed to obtain a highly transparent stable aqueous sol of zirconium oxide. This sol had a specific gravity of 1.177, a pH of 3.85, a viscosity of 5.6 mPa.s, a $ZrO_2$ content of 22.1 wt % and a particle diameter of 5 nm as observed by a transmission electron microscope.

PREPARATION EXAMPLE 11

Figure 9:
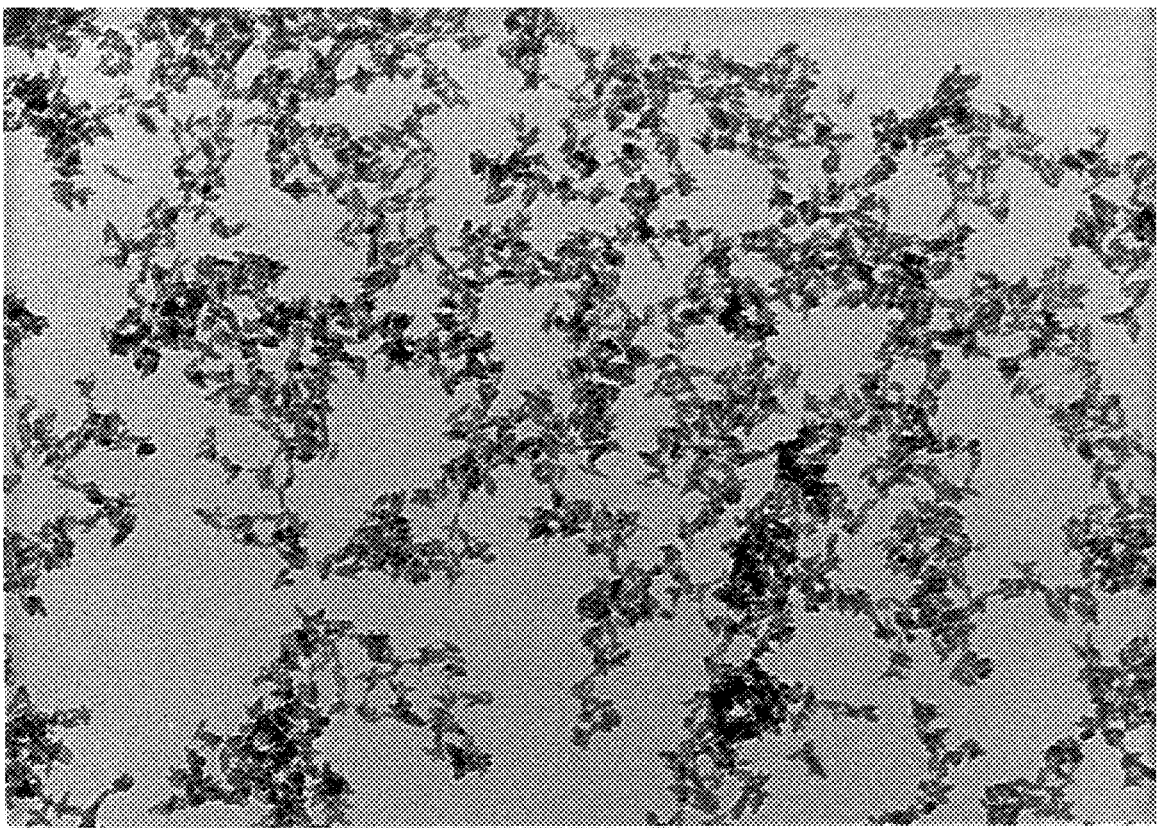
FIG. 9 is a transmission electron microscopic photograph showing the structure of particles of the modified stannic oxide methanol sol prepared in Preparation Example 11, with 200,000) magnifications.

3,125 g of an alkaline stannic oxide sol (pH: 9.80, $SnO_2$ content: 3.20 wt %) prepared in Preparation Example 9 was added with intensive stirring to 1,115 g of the hydrated zinc stannate sol (pH: 7.98, containing 2.69 wt % as calculated as $ZnO+SnO_2$) prepared in step (c) in Preparation Example 2, to obtain 4,240 g of a stable aqueous sol of modified stannic oxide of a low concentration. This sol was concentrated by an ultrafiltration apparatus with a ultrafilter of a fractional molecular weight of 50,000, to obtain 1,019 g of a modified stannic oxide aqueous sol of a high concentration. This sol had a proportion of $ZnSnO_3$ to $SnO_2$ being 30 wt % and a total metal oxide content of 11.8 wt % as calculated as $ZnO+SnO_2$. To this sol, 6 g of citric acid and 9 g of diisobutylamine were added with stirring. Then, while gradually adding 30 l of methanol, water was distilled off under reduced pressure by a rotary evaporator to obtain 484.8 g of a methanol sol of modified stannic oxide having water of the aqueous sol substituted by methanol. This sol had a specific gravity of 0.997, a viscosity of 11.1 mPa.s, a pH of 7.40 (as mixed with an equal weight amount of water) and a total metal oxide content of 24.8 wt % as (calculated as $ZnO+SnO_2$ and a water content of 0.40 wt %. The particle diameter as observed by a transmission electron microscope was from 15 to 20 nm. The transmission electron microscopic photograph is shown in FIG. 9.

PREPARATION EXAMPLE 12

1,306.4 g of water was added to 693.6 g of the hydrated zinc stannate sol (pH: 6.86, containing 8.65 wt % as calculated as $ZnO+SnO_2$) prepared in step (d') in Preparation Example 7 to dilute the sol to a concentration of 3.0 wt %. To this diluted sol, 6,250 g of the alkaline stannic oxide sol (pH: 9.80, $SnO_2$ content: 3.20 wt %) prepared in Preparation Example 9 was added with intense stirring to obtain 8,250 g of a stable aqueous sol of modified stannic oxide of a low concentration. This sol was concentrated by an ultrafiltration apparatus with an ultrafilter of a fractional molecular weight of 50,000, to obtain 2,000 g of a highly concentrated aqueous sol of modified stannic oxide. This sol had a proportion of $ZnSnO_3$ to $SnO_2$ being 30 wt % and a total metal oxide content of 11.6 wt % as calculated as $ZnO+SnO_2$. To this sol, 6 g of citric acid and 9 g of diisobutylamine were added with stirring. Then, while gradually adding 60 l of methanol, water was distilled under reduced pressure by a rotary evaporator, to obtain 1,281.8 g of a methanol sol of modified stannic oxide having water of the aqueous sol substituted by methanol. This sol had a specific gravity of 0.916, a viscosity of 21.1 mPa.s, a pH of 7.81 (as mixed with an equal weight amount of water), a total metal oxide content of 18.1 wt % as calculated as $ZnO+SnO_2$ and a water content of 0.32 wt %. The particle diameter as observed by a transmission electron microscope was from 15 to 20 nm.

PREPARATION EXAMPLE 13

Figure 10:
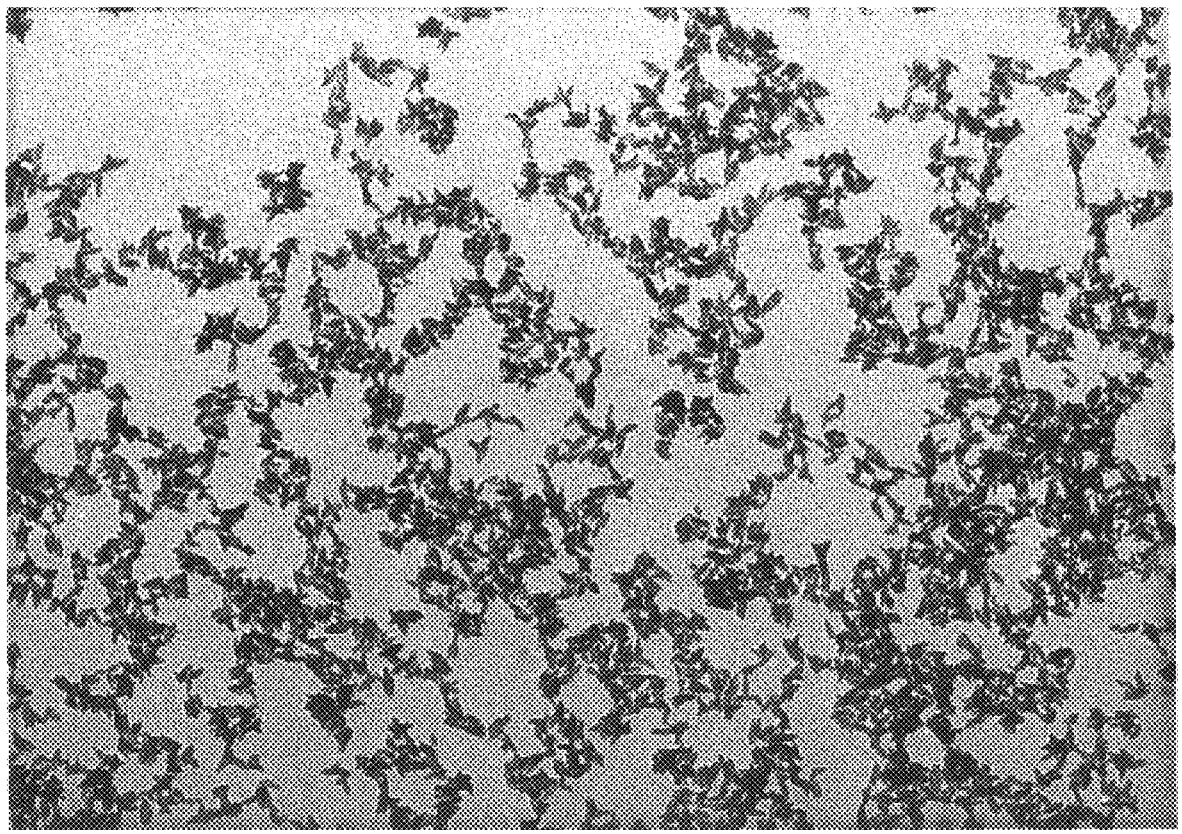
FIG. 10 is a transmission electron microscopic photograph showing the structure of particles of the modified stannic oxide methanol sol prepared in Preparation Example 13, with 200,000 magnifications.

538.8 g of an aqueous sodium stannate solution (containing 80.8 g as $SnO_2$) and 52.8 g of sodium gluconate were added to 12,500 g of the alkaline $SnO_2$ sol (containing 400.0 g of $SnO_2$) prepared in Preparation Example 9, to obtain a mixed solution A. Separately, 65.7 g of zinc chloride (containing 39.2 g as ZnO), 80.0 g of a 10% HCl aqueous solution and 750 g of a 35% $H_2O_2$ aqueous solution were added to 958 g of water, to obtain a mixed solution B. This mixed solution B was added to the above mixed solution A with intense stirring over a period of 90 minutes, followed by stirring for 30 minutes, to coat stannic oxide with a hydrated zinc stannate colloid. Further, heating for aging at 90° C. for 4 hour was carried out with stirring. After cooling, the pH was adjusted to about 10 by isopropylamine, to obtain an aqueous sol of modified stannic oxide of a low concentration. After removing an excess electrolyte by washing with water, this sol was concentrated by an ultrafiltration apparatus with a ultrafilter of a fractional molecular weight of 50,000, to obtain 2,658 g of an aqueous sol of modified stannic oxide of a high concentration. This sol had a proportion of $ZnSnO_3$ to $SnO_2$ being 30 wt % and a total metal oxide content of 18.0 wt % as calculated as $ZnO+SnO_2$. To this sol, 19.1 g of citric acid and 28.7 g of diisobutylamine were added with stirring. Then, while gradually adding 130 l of methanol, water was distilled under reduced pressure by a rotary evaporator, to obtain 1,913 g of a methanol sol of modified stannic oxide having water of the aqueous sol substituted by methanol. This sol had a specific gravity of 1.000, a viscosity of 12.0 mPa.s, a pH of 7.50 (as mixed with an equal weight amount of water), a total metal oxide content of 25.0 wt % as calculated as $ZnO+SnO_2$ and a water content of 0.31 wt %. The particle diameter as observed by a transmission electron microscope was from 15 to 20 nm. The transmission electron microscopic photograph is shown in FIG. 10.

PREPARATION EXAMPLE 14

Figure 11:
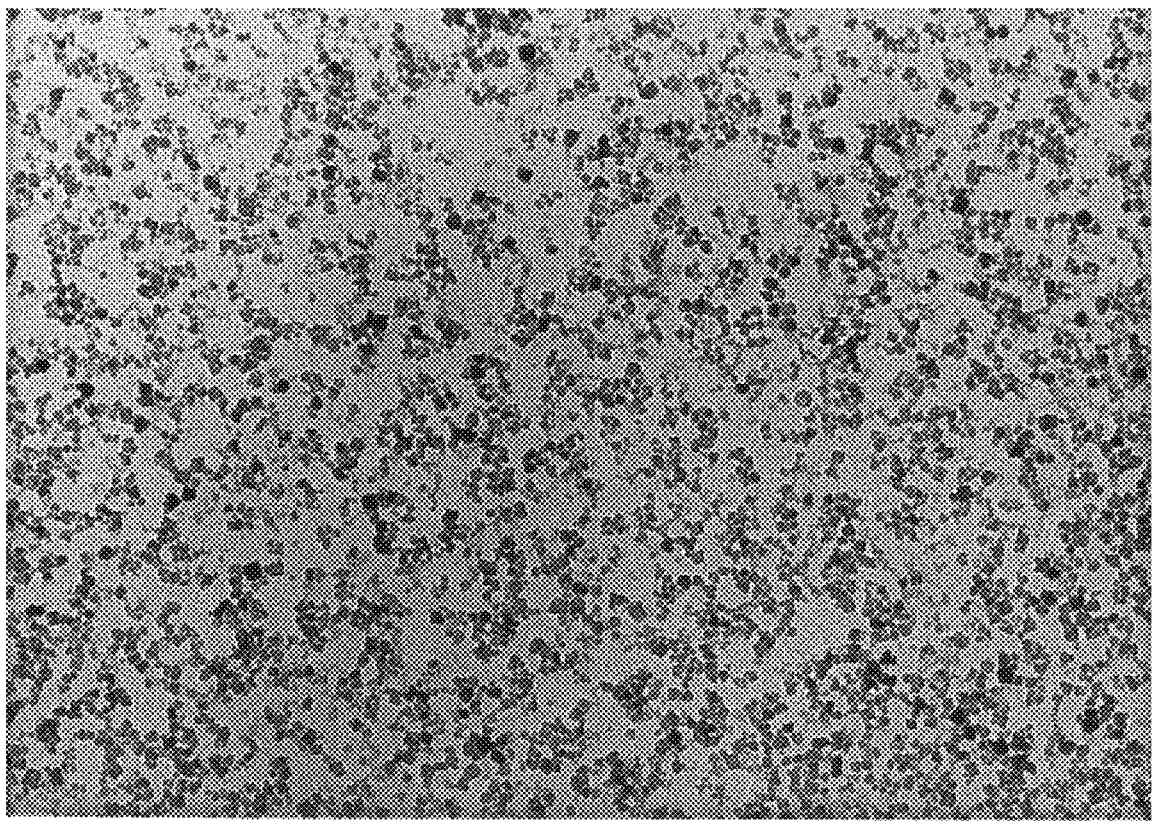
FIG. 11 is a transmission electron microscopic photograph showing the structure of particles of the modified zirconium oxide methanol sol prepared in Preparation Example 14, with 200,000 magnifications.

Water was added to 683.3 g of the zirconium oxide sol (containing 151 g of $ZrO_2$) prepared in Preparation Example 10 to dilute it to a $ZrO_2$ concentration of 4 wt %. Then, 196.1 g of an aqueous sodium stannate solution (containing 29.4 g as $SnO_2$) and 19.2 g of sodium gluconate were added, to obtain a mixed solution A. Separately, 26.6 g of zinc chloride (containing 15.9 g as ZnO), 32.4 g of a 10% HCl aqueous solution and 304.2 g of a 35% $H_2O_2$ aqueous solution were added to 388 g of water, to obtain a mixed solution B. This mixed solution B was added to the above mixed solution A with intense stirring over a period of 90 minutes, followed by stirring for 30 minutes, to coat zirconium oxide with the hydrated zinc stannate colloid. Further, heating for aging was carried out at 90° C. for 4 hours with stirring. After cooling, the pH was adjusted to about 10 by isopropylamine, to obtain an aqueous sol of modified zirconium oxide of a low concentration. From this sol, an excess electrolyte was removed by washing with water by an ultrafiltration apparatus with an ultrafilter of a fractional molecular weight of 50,000, and the sol was further passed through a column packed with an anion exchange resin (Amberlite IRA-410). Then, 3.9 g of citric acid and 5.8 g of diisobutylamine were added thereto, followed by concentration under reduced pressure by a rotary evaporator, to obtain 495.2 g of an aqueous sol of modified zirconium oxide of a high concentration. This sol had a specific gravity of 1.472, a viscosity of 8.5 mPa.s, a pH of 6.47, a proportion of $ZnSnO_3$ to $ZrO_2$ being 30 wt %, and a total metal oxide content of 37.5 wt % as calculated as $ZnO+SnO_2+ZrO_2$. 304 g of this sol was subjected to distillation of water under reduced pressure by a rotary evaporation, while gradually adding 6 l of methanol, to obtain 272 g of a methanol sol of modified zirconium oxide having water of the aqueous sol substituted by methanol. This sol had a specific gravity of 1.110, a viscosity of 2.7 mPa.s, a pH of 7.35 (as mixed with an equal amount of water), a total metal oxide content of 30.6 wt % as calculated as $ZnO+SnO_2+ZrO_2$, and a water content of 0.36 wt %. The particle diameter as observed by a transmission electron microscope was from 10 to 20 nm. The transmission electron microscopic photograph is shown in FIG. 11.

COMPARATIVE PREPARATION EXAMPLE 1

140.0 g of sodium stannate ($Na_2SnO_3.3H_2O$), manufactured by Showa Kako K. K. (containing 55 wt % as $SnO_2$) was dissolved in 2,360 g of water to obtain 2,500 g of an aqueous sodium stannate solution (containing 3.1 wt % as $SnO_2$). Separately, 69.7 g of zinc chloride ($ZnCl_2$) was dissolved in 2,430.3 g of water to obtain 2,500 g of an aqueous zinc chloride solution.

Step (a)

By means of a quantitative pump, the aqueous zinc chloride solution prepared as described above, was added and reacted to an aqueous sodium stannate solution over a period of about one hour with stirring by a disper, to obtain a colloidal slurry of hydrated zinc stannate. This slurry had a $ZnO/SnO_2$ molar ratio of 1.0 and a concentration of 2.37 wt % as calculated as $ZnO+SnO_2$.

Step (b)

The hydrated zinc stannate colloidal slurry obtained in step (a) was stirred at 25° C. for 2 hours for aging. The obtained slurry had a pH of 6.85 and an electrical conductivity of 20.2 ms/cm.

Step (c)

Figure 7:
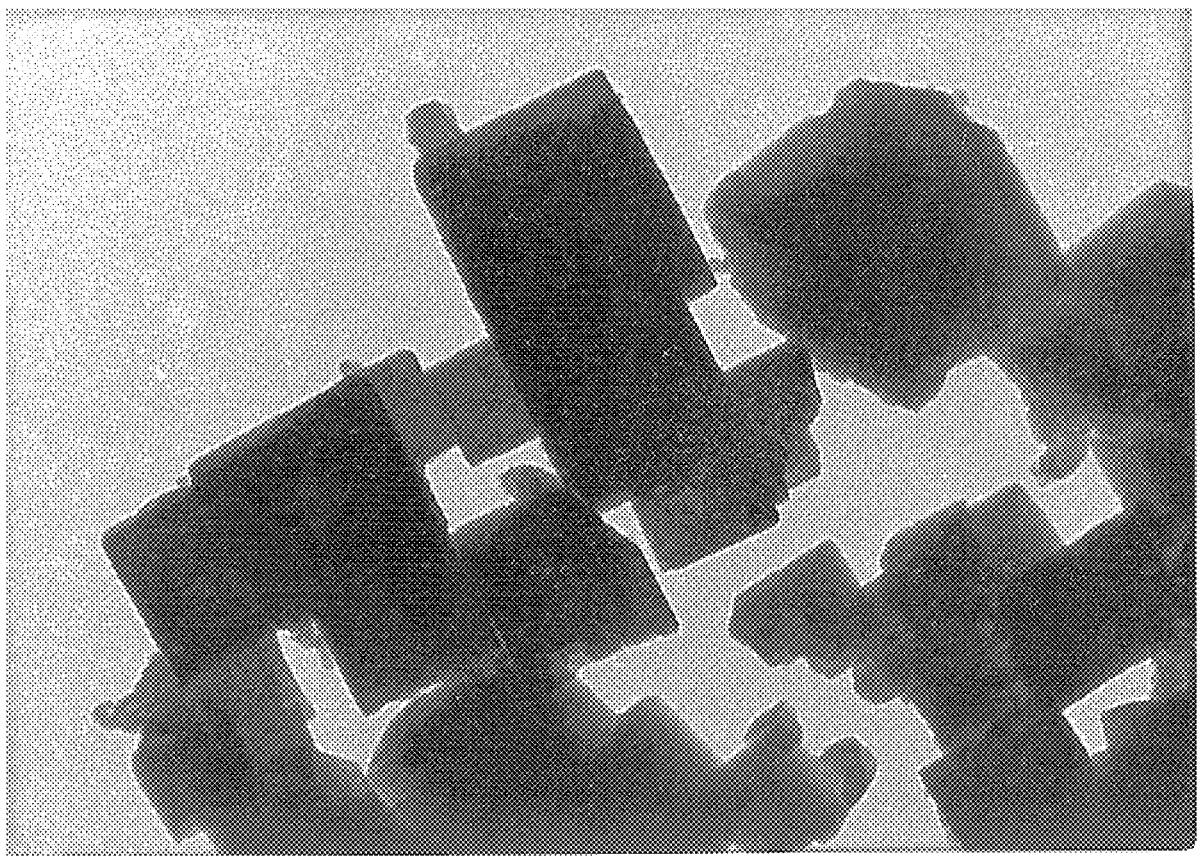
FIG. 7 is a transmission electron microscopic photograph showing the structure of particles of the hydrated zinc stannate sol prepared in Comparative Preparation Example 1, with 200,000 magnifications.

An excess electrolyte in the hydrated zinc stannate colloidal solution obtained in step (b), was removed by washing with water by filtration and decantation, but the hydrated zinc stannate colloidal slurry remained as it was and could not be converted to a sol. A transmission electron microscopic photograph of the particles of this hydrated zinc stannate, is shown in FIG. 7. This slurry had a pH of 5.00 and an electrical conductivity of 585 $\mu$s/cm.

COMPARATIVE PREPARATION EXAMPLE 2

267.1 g of the aqueous sodium zincate solution prepared in Preparation Example 5 and 86.9 g of sodium stannate ($Na_2SnO_3.3H_2O$, manufactured by Showa Kako K. K., containing 55 wt % as $SnO_2$) were dissolved in 2,063.1 g of water, to obtain an aqueous solution of sodium zincate/sodium stannate mixture (containing 1.02 wt % as ZnO, containing 1.98 wt % as $SnO_2$, $ZnO/SnO_2$ molar ratio: 0.95). Thus, 2,417.1 g of an aqueous solution of sodium zincate/sodium stannate mixture, was prepared. Separately, 295.7 g of 35 wt % hydrochloric acid was dissolved in 1,991.9 g of water, to obtain 2,287.6 g of an aqueous hydrochloric acid solution.

Step (a')

By means of a quantitative pump, the aqueous hydrochloric acid aqueous solution prepared as described above was added and reacted to the aqueous solution of sodium zincate/sodium stannate mixture over a period of about one hour with stirring by a disper, to obtain a slurry of agglomerates of hydrated zinc stannate colloidal particles. This slurry had a $ZnO/SnO_2$ molar ratio of 0.95.

Step (b')

210 g of 5 wt % hydrochloric acid was added to the slurry of agglomerates of hydrated zinc stannate colloidal particles, obtained in step (a') to adjust the pH to 7.07. Then, heating for aging was carried out at 90° C. for 4 hours. The obtained slurry had a concentration of 1.47 wt % as calculated as $ZnO+SnO_2$.

Step (c')

An excess electrolyte in the slurry of agglomerates of hydrated zinc stannate colloidal particles, obtained in step (b'), was removed by washing with water by an ultrafiltration method using 12 l of water, to obtain 658 g of a slurry of hydrated zinc stannate agglomerates. This slurry had a pH of 6.30 and an electrical conductivity of 147 $\mu$s/cm.

Step (d')

Figure 8:
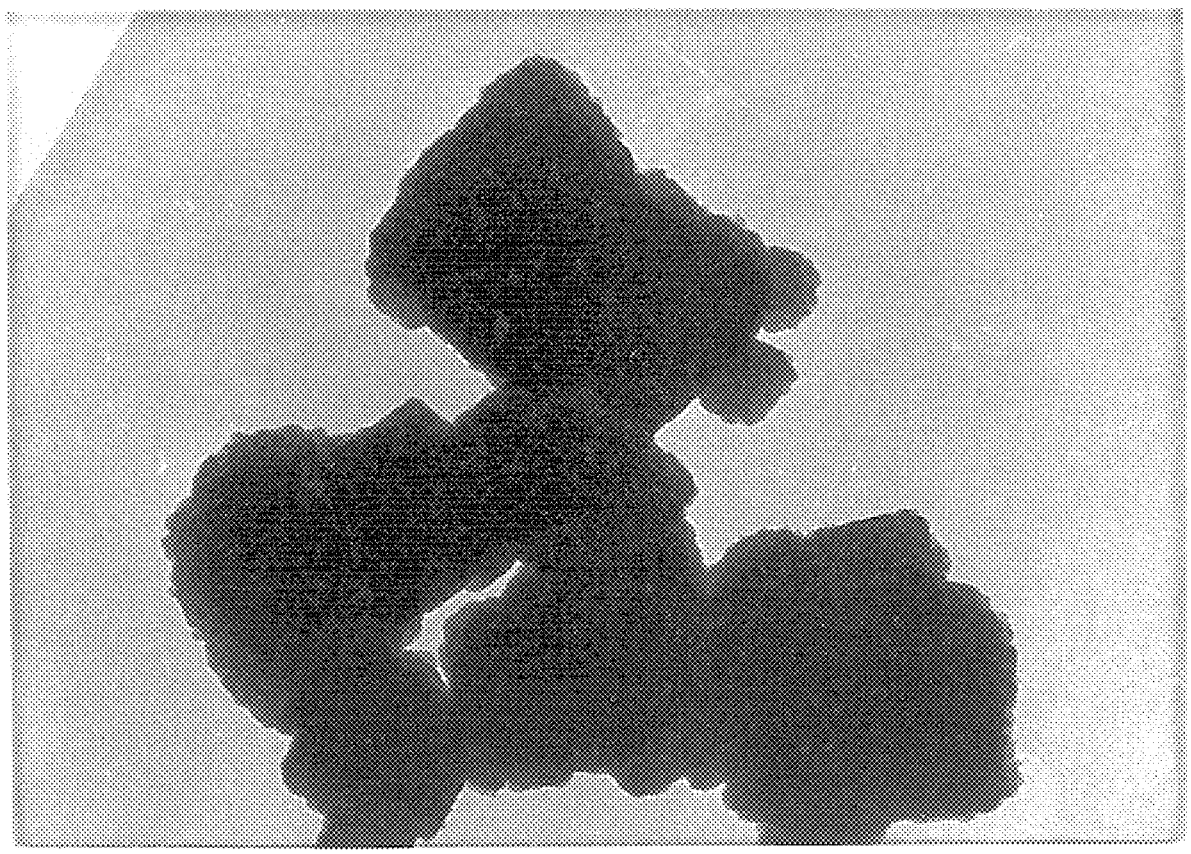
FIG. 8 is a transmission electron microscopic photograph showing the structure of particles of the hydrated zinc stannate sol prepared in Comparative Preparation Example 2, with 200,000 magnifications.

1.1 g of 15% potassium hydroxide and 300 g of glass beads (1.0 to 1.2 mm in diameter) were added to 300 g of the slurry obtained in step (c'), followed by dispersing in a wet system for 120 hours by a ball mill, whereby the slurry was not substantially peptized or formed into a sol. A transmission electron microscopic photograph of the agglomerates of this hydrated zinc stannate is shown in FIG. 8.

COMPARATIVE PREPARATION EXAMPLE 3

500 g of water was added to 55.8 g of the hydrated zinc stannate sol prepared in step (c) in Preparation Example 2, to obtain a dilute sol. To this dilute sol, 3,125 g of the alkaline stannic oxide sol prepared in Preparation Example 9 was added with intense stirring, to obtain 3,680.8 g of a modified stannic oxide aqueous sol of a low concentration. This sol was subjected to concentration by an ultrafiltration apparatus with an ultrafilter of a fractional molecular weight of 50,000, whereby the viscosity increased remarkably, and the sol could not be highly concentrated. This modified stannic oxide aqueous sol had a proportion of $ZnSnO_3$ to $SnO_2$ of 1.5 wt %. Further, to this highly viscous sol, 5 g of citric acid and 7.5 g of diisobutylamine were added with stirring, and then an attempt was made to substitute water of the aqueous sol with methanol by distilling water under reduced pressure by a rotary evaporator, while gradually adding methanol. However, coagulation occurred during the substitution, and it was not possible to produce a modified stannic oxide methanol sol.

Preparation of coating compositions

EXAMPLE 1

Into a glass container equipped with a magnetic stirrer, 105.3 parts by weight of γ-glycidoxypropyltrimethoxysilane corresponding to component (A) was introduced, and 36.8 parts by weight of a 0.01N hydrochloric acid aqueous solution was dropwise added over a period of 3 hours with stirring. After completion of the dropwise addition, stirring was continued for further 0.5 hour to obtain a partial hydrolyzate of γ-glycidoxypropyltrimethoxysilane. Then, 691.5 parts by weight of the methanol sol of hydrated zinc stannate (containing 18.8 wt % as $ZnO+SnO_2$) obtained in Preparation Example 2, 65 parts by weight of butyl CELLOSOLVE (β-hydroxyethylbutyl ether or butyl β-hydroxyethyl ether) and, as a curing agent, 4.2 parts by weight of aluminumacetyl acetonate, were added to 142.1 parts by weight of the above-mentioned partial hydrolyzate of γ-glycidoxypropyltrimethoxysilane, and the mixture was thoroughly stirred, followed by filtration, to obtain a coating composition.

EXAMPLE 2

Into a glass container equipped with a magnetic stirrer, 105.3 parts by weight of γ-glycidoxypropyltrimethoxysilane corresponding to component (A) was introduced, and 36.8 parts by weight of a 0.01N hydrochloric acid aqueous solution was dropwise added thereto over a period of 3 hours with stirring. After completion of the dropwise addition, stirring was continued for further 0.5 hour to obtain a partial hydrolyzate of γ-glycidoxypropyltrimethoxysilane. Then, 550.8 parts by weight of the methanol sol of hydrated zinc stannate (containing 23.6 wt % as $ZnO+SnO_2$) obtained in Preparation Example 7, 65 parts by weight of butyl CELLOSOLVE and, as a curing agent, 4.2 parts by weight of aluminumacetyl acetonate, were added to 142.1 parts by weight of the above-mentioned partial hydrolyzate of γ-glycidoxypropyltrimethoxysilane, and the mixture was thoroughly stirred, followed by filtration, to obtain a coating composition.

EXAMPLE 3

Into a glass container equipped with a magnetic stirrer, 22.3 parts by weight of tetraethoxysilane and 77.9 parts by weight of γ-glycidoxypropylmethyldiethoxysilane, corresponding to component (A), were introduced, and 36.8 parts by weight of a 0.01N hydrochloric acid aqueous solution was dropwise added thereto over a period of 3 hours with stirring. After completion of the dropwise addition, stirring was continued for further 0.5 hour, to obtain a partial hydrolyzate of tetraethoxysilane and γ-glycidoxypropylmethyldiethoxysilane. Then, 691.5 parts by weight of the methanol sol of hydrated zinc stannate (containing 18.8 wt % as $ZnO+SnO_2$) obtained in Preparation Example 2, 65 parts by weight of butyl CELLOSOLVE and, as curing agents, 2.6 parts by weight of aluminumacetyl acetonate and 0.5 part by weight of ammonium perchlorate, were added to 137 parts by weight of the above-mentioned partial hydrolyzate of tetraethoxysilane and γ-glycidoxypropylmethyldiethoxysilane, and the mixture was thoroughly stirred, followed by filtration, to obtain a coating composition.

EXAMPLE 4

Into a glass container equipped with a magnetic stirrer, 74.2 parts by weight of γ-glycidoxypropyltrimethoxysilane and 31.1 parts by weight of γ-glycidoxypropylmethyldimethoxysilane, corresponding to component (A), were introduced, and 36.8 parts by weight of a 0.01N hydrochloric acid aqueous solution was dropwise added thereto over a period of 3 hours with stirring. After completion of the dropwise addition, stirring was continued for further 0.5 hour, to obtain a partial hydrolyzate of γ-glycidoxypropyltrimethoxysilane and γ-glycidoxypropylmethyldimethoxysilane. Then, 550.8 parts by weight of the methanol sol of hydrated zinc stannate (containing 23.6 wt % as $ZnO+SnO_2$) obtained in Preparation Example 7, 65 parts by weight of butyl CELLOSOLVE and, as a curing agent, 4.2 parts by weight of aluminumacetyl acetonate, were added to 142.1 parts by weight of the above-mentioned partial hydrolyzate of γ-glycidoxypropyltrimethoxysilane and γ-glycidoxypropylmethyldimethoxysilane, and the mixture was thoroughly stirred, followed by filtration, to obtain a coating composition.

EXAMPLE 5

Into a glass container equipped with a magnetic stirrer, 37.1 parts by weight of γ-glycidoxypropyltrimethoxysilane, 37.1 parts by weight of γ-glycidoxypropylmethyldimethoxysilane and 23.7 parts by weight of tetraethoxysilane, corresponding to component (A), were introduced, and 36.8 parts by weight of a 0.01N hydrochloric acid aqueous solution was dropwise added thereto over a period of 3 hours with stirring. After completion of the dropwise addition, stirring was continued for further 0.5 hour, to obtain a partial hydrolyzate of γ-glycidoxypropyltrimethoxysilane, γ-glycidoxypropylmethyldimethoxysilane and tetraethoxysilane. Then, 550.8 parts by weight of the methanol sol of hydrated zinc stannate (containing 23.6 wt % as $ZnO+SnO_2$) obtained in Preparation Example 7, 65 parts by weight of butyl CELLOSOLVE and, as a curing agent, 4.2 parts by weight of aluminumacetyl acetonate, were added to 134.7 parts by weight of the above-mentioned partial hydrolyzate of γ-glycidoxypropyltrimethoxysilane, γ-glycidoxypropylmethyldimethoxysilane and tetraethoxysilane, and the mixture was thoroughly stirred, followed by filtration, to obtain a coating composition.

EXAMPLE 6

Into a glass container equipped with a magnetic stirrer, 105.3 parts by weight of γ-glycidoxypropyltrimethoxysilane corresponding to component (A) was introduced, and 36.8 parts by weight of a 0.01N hydrochloric acid aqueous solution was dropwise added thereto over a period of 3 hours with stirring. After completion of the dropwise addition, stirring was continued for further 0.5 hour, to obtain a partial hydrolyzate of γ-glycidoxypropyltrimethoxysilane. Then, 524.2 parts by weight of the methanol sol of modified stannic oxide (containing a total metal oxide of 24.8 wt % as calculated as $ZnO+SnO_2$) prepared in Preparation Example 11, 65 parts by weight of butyl CELLOSOLVE and, as a curing agent, 4.2 parts by weight of aluminumacetyl acetonate, were added to 142.1 parts by weight of the above-mentioned partial hydrolyzate of γ-glycidoxypropyltrimethoxysilane, and the mixture was thoroughly stirred, followed by filtration, to obtain a coating composition.

EXAMPLE 7

Into a glass container equipped with a magnetic stirrer, 105.3 parts by weight of γ-glycidoxypropyltrimethoxysilane corresponding to component (A) was introduced, and 36.8 parts by weight of a 0.01N hydrochloric acid aqueous solution was dropwise added thereto over a period of 3 hours with stirring. After completion of the dropwise addition, stirring was continued for further 0.5 hour, to obtain a partial hydrolyzate of γ-glycidoxypropyltrimethoxysilane. Then, 520.0 parts by weight of the methanol sol of modified stannic oxide (containing a total metal oxide of 25.0 wt % as calculated as $ZnO+SnO_2$) prepared in Preparation Example 13, 65 parts by weight of butyl CELLOSOLVE and, as a curing agent, 4.2 parts by weight of aluminumacetyl acetonate, were added to 142.1 parts by weight of the above-mentioned partial hydrolyzate of γ-glycidoxypropyltrimethoxysilane, and the mixture was thoroughly stirred, followed by filtration, to obtain a coating composition.

EXAMPLE 8

Into a glass container equipped with a magnetic stirrer, 22.3 parts by weight of tetraethoxysilane and 77.9 parts by weight of γ-glycidoxypropylmethyldiethoxysilane, corresponding to component (A), were introduced, and 36.8 parts by weight of a 0.01N hydrochloric acid aqueous solution was dropwise added thereto over a period of 3 hours with stirring. After completion of the dropwise addition, stirring was continued for further 0.5 hour, to obtain a partial hydrolyzate of tetraethoxysilane and γ-glycidoxypropylmethyldiethoxysilane. Then, 524.2 parts by weight of the methanol sol of modified stannic oxide (containing 24.8 wt % of a total metal oxide as calculated as $ZnO+SnO_2$) prepared in Preparation Example 11, 65 parts by weight of butyl CELLOSOLVE and, as curing agents, 2.6 parts by weight of aluminumacetyl acetonate and 0.5 part by weight of ammonium perchlorate, were added to 137 parts by weight of the above-mentioned partial hydrolyzate of tetraethoxysilane and γ-glycidoxypropylmethyldiethoxysilane, and the mixture was thoroughly stirred, followed by filtration, to obtain a coating composition.

EXAMPLE 9

Into a glass container equipped with a magnetic stirrer, 74.2 parts by weight of γ-glycidoxypropyltrimethoxysilane and 31.1 parts by weight of γ-glycidoxypropylmethyldimethoxysilane, corresponding to component (A), were introduced, and 36.8 parts by weight of a 0.01N hydrochloric acid aqueous solution was dropwise added thereto over a periods of 3 hours with stirring. After completion of the dropwise addition, stirring was continued for further 0.5 hour, to obtain a partial hydrolyzate of γ-glycidoxypropyltrimethoxysilane and γ-glycidoxypropylmethyldimethoxysilane. Then, 520.0 parts by weight of the methanol sol of modified stannic oxide (containing 25.0 wt % of a total metal oxide as calculated as $ZnO+SnO_2$) obtained in Preparation Example 13, 65 parts by weight of butyl CELLOSOLVE and, as a curing agent, 4.2 parts by weight of aluminumacetyl acetonate, were added to 142.1 parts by weight of the above-mentioned partial hydrolyzate of γ-glycidoxypropyltrimethoxysilane and γ-glycidoxypropylmethyldimethoxysilane, and the mixture was thoroughly stirred, followed by filtration, to obtain a coating composition.

EXAMPLE 10

Into a glass container equipped with a magnetic stirrer, 37.1 parts by weight of γ-glycidoxypropyltrimethoxysilane, 37.1 parts by weight of γ-glycidoxypropylmethyldimethoxysilane and 23.7 parts by weight of tetraethoxysilane, corresponding to component (A), were introduced, and 36.8 parts by weight of a 0.01N hydrochloric acid aqueous solution was dropwise added thereto over a period of 3 hours with stirring. After completion of the dropwise addition, stirring was continued for further 0.5 hour, to obtain a partial hydrolyzate of γ-glycidoxypropyltrimethoxysilane, γ-glycidoxypropylmethyldimethoxysilane and tetraethoxysilane. Then, 520.0 parts by weight of the methanol sol of modified stannic oxide (containing 25.0 wt % of a total metal oxide as calculated as $ZnO+SnO_2$) obtained in Preparation Example 13, 65 parts by weight of butyl CELLOSOLVE and, as a curing agent, 4.2 parts by weight of aluminumacetyl acetonate, were added to 134.7 parts by weight of the above-mentioned partial hydrolyzate of γ-glycidoxypropyltrimethoxysilane, γ-glycidoxypropylmethyldimethoxysilane and tetraethoxysilane, and the mixture was thoroughly stirred, followed by filtration, to obtain a coating composition.

EXAMPLE 11

Into a glass container equipped with a magnetic stirrer, 105.3 parts by weight of γ-glycidoxypropyltrimethoxysilane corresponding to component (A) was introduced, and 36.8 parts by weight of a 0.01N hydrochloric acid aqueous solution was dropwise added thereto over a period of 3 hours with stirring. After completion of the dropwise addition, stirring was continued for further 0.5 hour, to obtain a partial hydrolyzate of γ-glycidoxypropyltrimethoxysilane. Then, 718.2 parts by weight of the methanol sol of modified stannic oxide (containing 18.1 wt % of a total metal oxide as calculated as $ZnO+SnO_2$) obtained in Preparation Example 12, 65 parts by weight of butyl CELLOSOLVE and, as a curing agent, 4.2 parts by weight of aluminumacetyl acetonate, were added to 142.1 parts by weight of the above-mentioned partial hydrolyzate of γ-glycidoxypropyltrimethoxysilane, and the mixture was thoroughly stirred, followed by filtration, to obtain a coating composition.

EXAMPLE 12

Into a glass container equipped with a magnetic stirrer, 105.3 parts by weight of γ-glycidoxypropyltrimethoxysilane corresponding to component (A) was introduced, and 36.8 parts by weight of a 0.01N hydrochloric acid aqueous solution was dropwise added thereto over a period of 3 hours with stirring. After completion of the dropwise addition, stirring was continued for further 0.5 hour, to obtain a partial hydrolyzate of γ-glycidoxypropyltrimethoxysilane. Then, 424.8 parts by weight of the methanol sol of modified stannic oxide (containing 30.6 wt % of a total metal oxide as calculated as $ZnO+SnO_2+ZrO_2$) obtained in Preparation Example 14, 65 parts by weight of butyl CELLOSOLVE and, as a curing agent, 4.2 parts by weight of aluminumacetyl acetonate, were added to 142.1 parts by weight of the above-mentioned partial hydrolyzate of γ-glycidoxypropyltrimethoxysilane, and the mixture was thoroughly stirred, followed by filtration, to obtain a coating composition.

COMPARATIVE EXAMPLE 1

Into a glass container equipped with a magnetic stirrer, 105.3 parts by weight of γ-glycidoxypropyltrimethoxysilane corresponding to component (A) was introduced, and 36.8 parts by weight of a 0.01N hydrochloric acid aqueous solution was dropwise added thereto over a period of 3 hours with stirring. After completion of the dropwise addition, stirring was continued for further 0.5 hour, to obtain a partial hydrolyzate of γ-glycidoxypropyltrimethoxysilane. Then, 433.3 parts by weight of a methanol sol of modified stannic oxide having a particle diameter of about 18 nm (having a weight ratio of $(WO_3+SnO_2)/SnO_2$ of 0.46 and containing 30.0 wt % of a total metal oxide as calculated as $WO_3+SnO_2$) comprising colloidal particles of stannic oxide having a particle diameter of 7.2 nm, as nuclei, and colloidal particles of a tungsten oxide/stannic oxide composite having a weight ratio of $WO_3/SnO_2$ of 5.12 and a particle diameter of 5 nm, coated on the surface of the nuclei, 65 parts by weight of butyl CELLOSOLVE and, as a curing agent, 4.2 parts by weight of aluminumacetyl acetonate, were added to 142.1 parts by weight of the above-mentioned partial hydrolyzate of γ-glycidoxypropyltrimethoxysilane, and the mixture was thoroughly stirred, followed by filtration, to obtain a coating composition.

COMPARATIVE EXAMPLE 2

Into a glass container equipped with a magnetic stirrer, 105.3 parts by weight of γ-glycidoxypropyltrimethoxysilane corresponding to component (A) was introduced, and 36.8 parts by weight of a 0.01N hydrochloric acid aqueous solution was dropwise added thereto over a period of 3 hours with stirring. After completion of the dropwise addition, stirring was continued for further 0.5 hour, to obtain a partial hydrolyzate of γ-glycidoxypropyltrimethoxysilane. Then, 650.0 parts by weight of a silica methanol sol (particle diameter: 15 nm, containing 20 wt % of $SiO_2$), 65 parts by weight of butyl CELLOSOLVE and, as a curing agent, 4.2 parts by weight of aluminumacetyl acetonate, were added to 142.1 parts by weight of the above-mentioned partial hydrolyzate of γ-glycidoxypropyltrimethoxysilane, and the mixture was thoroughly stirred, followed by filtration, to obtain a coating composition.

Formation of Cured Films

The coating compositions obtained in Examples 1 to 12 and Comparative Example 1 and 2 were, respectively, coated on a commercially available polycarbonate plate having a refractive index $n_D=1.59$ by spin coating and heat-treated at 120° C. for 2 hours to cure the coating films to obtain test samples (optical elements).

The films formed on polycarbonate from the coating compositions obtained in Examples 1 to 12 and Comparative Examples 1 and 2 were designated as Example Films 1 to 12 and Comparative Example Films 1 and 2, respectively, which were subjected to the following tests. The results are shown in Tables 1 and 2.

Scratch Resistance Test

The above test samples were rubbed with a steel wool #0000, whereupon scratch resistance was visually evaluated in accordance with the following evaluation standards:

A: No substantial scratch marks observed even when rubbed intensely.

B: Substantial scratch marks were observed when rubbed intensely.

C: Scratch marks equivalent to those on the optical base material were observed.

Test on Presence or Absence of Interference Fringes

The above test samples were visually observed under a fluorescent lamp and evaluated in accordance with the following evaluation standards:

A: No substantial interference fringes were observed.

B: Slight interference fringes were observed.

C: Substantial interference fringes were observed.

Adhesion Test

Each test sample was scored with cross cut lines at spaces of 1 mm to define 100 sections, and an adhesive tape (Cellotape, tradename, manufactured by Nichiban K. K.) was firmly bonded to the cross scored portion. Then, the adhesive tape was peeled quickly, and the presence or absence of peeling of the cured film upon peeling off of the adhesive tape was examined. The case where no peeling of the cured film was observed, was designated as "good", and the case where peeling was observed, was designated as "poor".

Hot Water Resistance Test

Each test sample was immersed in a warm water of 80° C. for 2 hours, whereupon the sample was subjected to the same adhesion test as described above.

Transparency Test

Each test sample was visually examined under a fluorescent lamp in a dark room to see if there was any fogging. The evaluation standards were as follows:

A: No fogging was observed.

B: Slight fogging was observed.

C: Substantial fogging was observed.

Weather Resistance Test

On the cured film of each test sample, an antireflection film made of a vapor deposition film of a inorganic oxide, was formed to obtain a test sample (optical element), which was subjected to outdoor exposure for one month, and the change in the appearance of the test sample (optical element) after exposure was visually evaluated.

TABLE 1

| Example Film | Scratch resistance | Interference fringes | Adhesion | Warm water resistance | Transparency | Weather resistance |
|---|---|---|---|---|---|---|
| 1 | A | A | Good | Good | A | Good |
| 2 | A | A | Good | Good | A | Good |
| 3 | A | A | Good | Good | A | Good |
| 4 | A | A | Good | Good | A | Good |
| 5 | A | A | Good | Good | A | Good |
| 6 | A | A | Good | Good | A | Good |
| 7 | A | A | Good | Good | A | Good |
| 8 | A | A | Good | Good | A | Good |
| 9 | A | A | Good | Good | A | Good |
| 10 | A | A | Good | Good | A | Good |

TABLE 1-continued

| Example Film | Scratch resistance | Interference fringes | Adhesion | Warm water resistance | Transparency | Weather resistance |
|---|---|---|---|---|---|---|
| 11 | A | A | Good | Good | A | Good |
| 12 | A | A | Good | Good | A | Good |

TABLE 2

| Comparative Example Film | Scratch resistance | Interference fringes | Adhesion | Warm water resistance | Transparency | Weather resistance |
|---|---|---|---|---|---|---|
| 1 | A | A | Good | Partly peeled | A | Slight yellowed |
| 2 | A | C | Good | Good | A | Good |

With the test samples having cured films made of the coating compositions of the present invention, good results were obtained in the above tests.

On the other hand, in a case where particles of modified stannic oxide coated with colloidal particles of a tungsten oxide-stannic oxide composite, were used instead of the particles of hydrated zinc stannate as component (B), the water resistance decreased, and further, as a result of the exposure test for a long period of time, the particles of modified stannic oxide are considered to have been yellowed due to the exposure to the sunlight.

Further, in a case where particles of modified stannic oxide coated with colloidal particles of a tungsten oxide-stannic oxide composite, were used instead of the particles of modified metal oxide such as modified stannic oxide or modified zirconium oxide coated with hydrated zinc stannate particles, for component (B'), the water resistance decreased, and further, as a result of the exposure test for a long period of time, the particles of modified stannic oxide are believed to have been yellowed due to the exposure to the sunlight.

Still further, in a case where colloidal silica particles were used instead of the particles of hydrated zinc stannate for component (B), the refractive index was low, and when a cured film was formed on a substrate having a high refractive index, interference fringes were observed on the coated film, such being undesirable.

The hydrated zinc stannate sol obtained according to the first aspect of the present invention has a primary particle diameter of from 2 to 200 nm and high transparency, and its dried coating film shows a refractive index of about 1.7 to 1.9 and is excellent in light resistance, weather resistance, antistatic property, abrasion resistance, adhesion, etc.

The sol of colloidal particles of an oxide of a metal having a valence of 3, 4 or 5, surface-coated with colloidal particles of hydrated zinc stannate, obtained according to the second aspect of the present invention, has a primary particle diameter of from 4.5 to 100 nm and high transparency, and its dried coating film shows a refractive index of about 1.7 to 2.2 and is excellent in water resistance, light resistance and weather resistance and also has good antistatic property, abrasion resistance and adhesion.

With a hard coating agent containing colloidal particles of an oxide of a metal having a valence of 3, 4 or 5, such as $SnO_2$ particles, $ZrO_2$ particles, $TiO_2$ particles, $Sb_2O_5$ particles or composite particles of $SnO_2$ and $ZrO_2$ particles, water resistance of a coating film obtainable by coating and curing it, is low. Whereas, with a hard coating agent containing the modified metal oxide particles of the present invention obtained by coating colloidal particles of an oxide of a metal having a valence of 3, 4 or 5, with colloidal particles of hydrated zinc stannate, it has been found that the water resistance of a coating film obtained by coating and curing in the same manner as above, is improved.

The sols according to the first and second aspects of the present invention show adequate stability to be supplied as industrial products and can be mixed stably with a resin emulsion, a modacrylic resin or a partial hydrolyzate of a silane coupling agent.

The sols of the present invention having such a nature, are useful particularly as a component for improving the refractive index, dyability, chemical resistance, water resistance, light resistance, weather resistance, abrasion resistance, etc. for forming a hard coating film on the surface of a plastic molded product such as a plastic lens or film.

The sols of the present invention can be used also for applications as flame retarding adjuvants for e.g. a halogen-containing vinyl resin or a modacrylic resin, as flame retarding agents for e.g. fibers and papers, as microfillers for absorbing ultraviolet rays, or as microfillers for far infrared radiation.

Further, a powder obtained by drying the sol according to the first aspect of the present invention by e.g. a spray dryer, is useful as a flame retardant for a halogen-containing resin, and an anhydride obtained by calcining and dehydrating this powder at a temperature of at least 300° C., can be used also as a flame retardant for an engineering plastic having a high processing temperature.

Cured films obtainable by the coating compositions according to the third and fourth aspects of the present invention will make coating layers having improved scratch resistance, surface hardness, abrasion resistance, transparency, heat resistance, light resistance, weather resistance, particularly water resistance. Further, such coating layers have excellent adhesive properties with an anti-reflection film (such as an inorganic oxide or a fluorinated compound) or a metal vapor-deposited film, formed thereon.

The modified metal oxide particles coated with the hydrated zinc stannate particles used for component (B') according to the fourth aspect of the present invention, exhibit the same function as in a case where the hydrated zinc stannate particles are used alone, and as a result, they give high water resistance to the coating composition of the present invention. In the present invention, by coating the surface of particles made of an oxide of a metal having a valence of 3, 4 or 5, as nuclei, with the hydrated zinc stannate particles, only the particle surface is constituted by the hydrated zinc stannate particles, whereby high water resistance can be obtained with a small amount of hydrated zinc stannate particles per unit volume, and the hydrated zinc stannate particles can be used efficiently.

Optical elements having cured films made of the coating compositions according to the third and fourth aspect of the present invention have the above-mentioned various properties and further present optical elements having excellent appearance and high transparency, which are free from interference fringes even when such cured films are formed on substrates having a high refractive index of a level of 1.54 or higher.

The optical elements to be employed in the third and fourth aspects of the present invention are most preferably plastic molded products, and as such plastic molded products, not only lenses for eyeglasses, but also lenses for cameras, window glasses for automobiles and optical filters used for liquid crystal display or plasma display devices may, for example, be mentioned. By coating the coating compositions of the present invention on such plastic molded products, plastic molded products having cured films made of the above-described coating compositions, will be obtained.

What is claimed is:

1. A coating composition comprising:
 (A) 100 parts by weight of at least one silicon-containing substance selected from the group consisting of organic silicon compounds of the formula (I):

wherein each of $R^1$ and $R^3$ is an alkyl group, an aryl group, a halogenated alkyl group, a halogenated aryl group, an alkenyl group, or an organic group having an epoxy group, an acryloyl group, a methacryloyl group, a mercapto group, an amino group or a cyano group, which is bonded to the silicon atom by a Si—C bond, $R^2$ is a $C_{1-8}$ alkyl group, an alkoxyalkyl group, or an acyl group, and each of a and b is an integer of 0, 1 or 2, provided that a+b is an integer of 0, 1 or 2, and the formula (II):

wherein $R^4$ is a $C_{1-5}$ alkyl group, X is a $C_{1-4}$ alkyl group or an acyl group, Y is a methylene group or a $C_{2-20}$ alkylene group, and c is an integer of 0 or 1, and their hydrolyzates; and
 (B) 1–500 parts by weight of particles of a hydrated zinc stannate having a primary particle diameter of from 2 to 200 nm and represented by the formula $xZnO \cdot ySnO_2 \cdot zH_2O$ wherein the molar ratio of x:y:z is 1:0.83 to 1.43:1.00 to 5.00.

2. The coating composition according to claim 1, wherein component (A) is at least one silicon-containing substance selected from the group consisting of the organic silicon compounds of the formula (I) and their hydrolyzates.

3. The coating composition according to claim 1, which contains, as component (C), at least one metal compound selected from the group consisting of metal salts, metal alkoxides and metal chelates, as a curing catalyst.

4. A coating composition comprising:
 (A) 100 parts by weight of at least one silicon-containing substance selected from the group consisting of organic silicon compounds of the formula (I):

wherein each of $R^1$ and $R^3$ is an alkyl group, an aryl group, a halogenated alkyl group, a halogenated aryl group, an alkenyl group, or an organic group having an epoxy group, an acryloyl group, a methacryloyl group, a mercapto group, an amino group or a cyano group, which is bonded to the silicon atom by a Si—C bond, $R^2$ is a $C_{1-8}$ alkyl group, an alkoxyalkyl group, or an acyl group, and each of a and b is an integer of 0, 1 or 2, provided that a+b is an integer of 0, 1 or 2, and the formula (II):

wherein $R^4$ is a $C_{1-5}$ alkyl group, X is a $C_{1-4}$ alkyl group or an acyl group, Y is a methylene group or a $C_{2-20}$ alkylene group, and c is an integer of 0 or 1, and their hydrolyzates; and
 (B') 1–500 parts by weight of particles of a modified metal oxide which have a primary particle diameter of from 4.5 to 100 nm and which comprise particles (i) of an oxide of a metal having a valence of 3, 4 or 5, as nuclei, and particles (ii) of a hydrated zinc stannate represented by the formula $xZnO.ySnO_2.zH_2O$ wherein the molar ratio of x:y:z is 1:0.83 to 1.43:1.00 to 5.00, coated on the surface of the particles (i).

5. The coating composition according to claim 4, wherein component (A) is at least one silicon-containing substance selected from the group consisting of the organic silicon compounds of the formula (I) and their hydrolyzates.

6. The coating composition according to claim 4, wherein the primary particle diameter of the particles (i) of an oxide of a metal having a valence of 3, 4 or 5 in component (B'), is from 4 to 50 nm.

7. The coating composition according to claim 4, wherein the primary particle diameter of the particles (ii) of a hydrated zinc stannate in component (B'), is from 2 to 20 nm.

8. The coating composition according to claim 4, wherein the oxide of a metal having a valence of 3, 4 or 5 is an oxide of Sn, an oxide of Zr, an oxide of Ti, an oxide of Sb or a mixture thereof.

9. The coating composition according to claim 4, wherein the particles of a modified metal oxide in component (B') are obtained by mixing 100 parts by weight of particles (i) of an oxide of a metal having a valence of 3, 4 or 5 with from 2 to 100 parts by weight of particles (ii) of a hydrated zinc stannate represented by the formula $xZnO.ySnO_2.zH_2O$ wherein the molar ratio of x:y:z is 1:0.83 to 1.43:1.00 to 5.00.

10. The coating composition according to claim 4, which contains, as component (C), at least one metal compound selected from the group consisting of metal salts, metal alkoxides and metal chelates, as a curing catalyst.

* * * * *